(12) United States Patent
Kamath et al.

(10) Patent No.: US 10,461,632 B1
(45) Date of Patent: Oct. 29, 2019

(54) CURRENT SENSING FOR BRIDGELESS PFC CONVERTERS

(71) Applicant: SEMICONDUCTOR COMPONENTS INDUSTRIES, LLC, Phoenix, AZ (US)

(72) Inventors: Nikhilesh S. Kamath, Chandler, AZ (US); Armando Gabriel Mesa, Tempe, AZ (US); Ajay Karthik Hari, Scottsdale, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/373,793

(22) Filed: Apr. 3, 2019

Related U.S. Application Data

(60) Provisional application No. 62/655,598, filed on Apr. 10, 2018.

(51) Int. Cl.
*H02M 7/493* (2007.01)
*H02M 1/42* (2007.01)
*H02M 7/21* (2006.01)

(52) U.S. Cl.
CPC .......... *H02M 1/4208* (2013.01); *H02M 7/21* (2013.01)

(58) Field of Classification Search
CPC .......... H02M 7/06; H02M 7/068; H02M 7/21; H02M 7/4225; H02M 7/493;
(Continued)

(56) References Cited

U.S. PATENT DOCUMENTS

| | | | |
|---|---|---|---|
| 7,164,591 B2 * | 1/2007 | Soldano | H02M 1/4225 363/89 |
| 7,269,038 B2 * | 9/2007 | Shekhawat | H02M 1/42 363/71 |

(Continued)

OTHER PUBLICATIONS

"Choosing the Right Power Factor Controller Solution," ON Semiconductor Power Factor Correction Handbook, HBD853/D, Rev. 5, Apr. 2014, 130 pages, Copyright SCILLC.
(Continued)

*Primary Examiner* — Yemane Mehari
(74) *Attorney, Agent, or Firm* — Dickinson Wright PLLC; Mark E. Scott; James P. Purrington

(57) ABSTRACT

Bridgeless PFC converters. Example embodiments are methods of operating a power converter including operating the power converter during a positive half-line cycle of an alternating current (AC) source by: charging an inductance through a low-side switch with a first charging current having a first polarity; measuring the first charging current using a low-side current transformer (CT), while shorting a secondary winding of a high-side CT; and discharging the inductance through a high-side switch with a first discharging current having the first polarity. Operating the power converter during a negative half-line cycle of the AC source by: charging the inductance through the high-side switch with a second charging current having a second polarity; measuring the second charging current using the high-side CT, while shorting a secondary winding of the low-side CT; and discharging the inductance through the low-side switch with a second discharging current having the second polarity.

20 Claims, 15 Drawing Sheets

(58) Field of Classification Search
CPC ............. H02M 1/4208; H02M 1/4225; H02M 3/156–158; H02M 3/1588; H02M 3/285; Y02B 70/126; Y02B 70/1466
USPC ............................................. 363/71, 89, 126
See application file for complete search history.

(56) References Cited

U.S. PATENT DOCUMENTS

| | | | | |
|---|---|---|---|---|
| 8,093,858 B1* | 1/2012 | Kadah | ..................... | H02P 1/42 318/786 |
| 2004/0047167 A1* | 3/2004 | Prasad | ................ | H02M 1/4225 363/125 |
| 2006/0220628 A1* | 10/2006 | Soldano | .............. | H02M 1/4233 323/282 |
| 2015/0180330 A1* | 6/2015 | Ye | ..................... | H02M 1/4208 363/126 |
| 2016/0028304 A1* | 1/2016 | O'Day | ................ | H02M 1/4225 363/89 |

OTHER PUBLICATIONS

"Power Factor Controller for Compact and Robust, Continuous Conduction Mode Pre-Converters," ON Semiconductor Product Description Publication No. NCP1654, Jan. 2016—Rev. 5, 23 pages, Copyright Semiconductor Components Industries, LLC.

\* cited by examiner

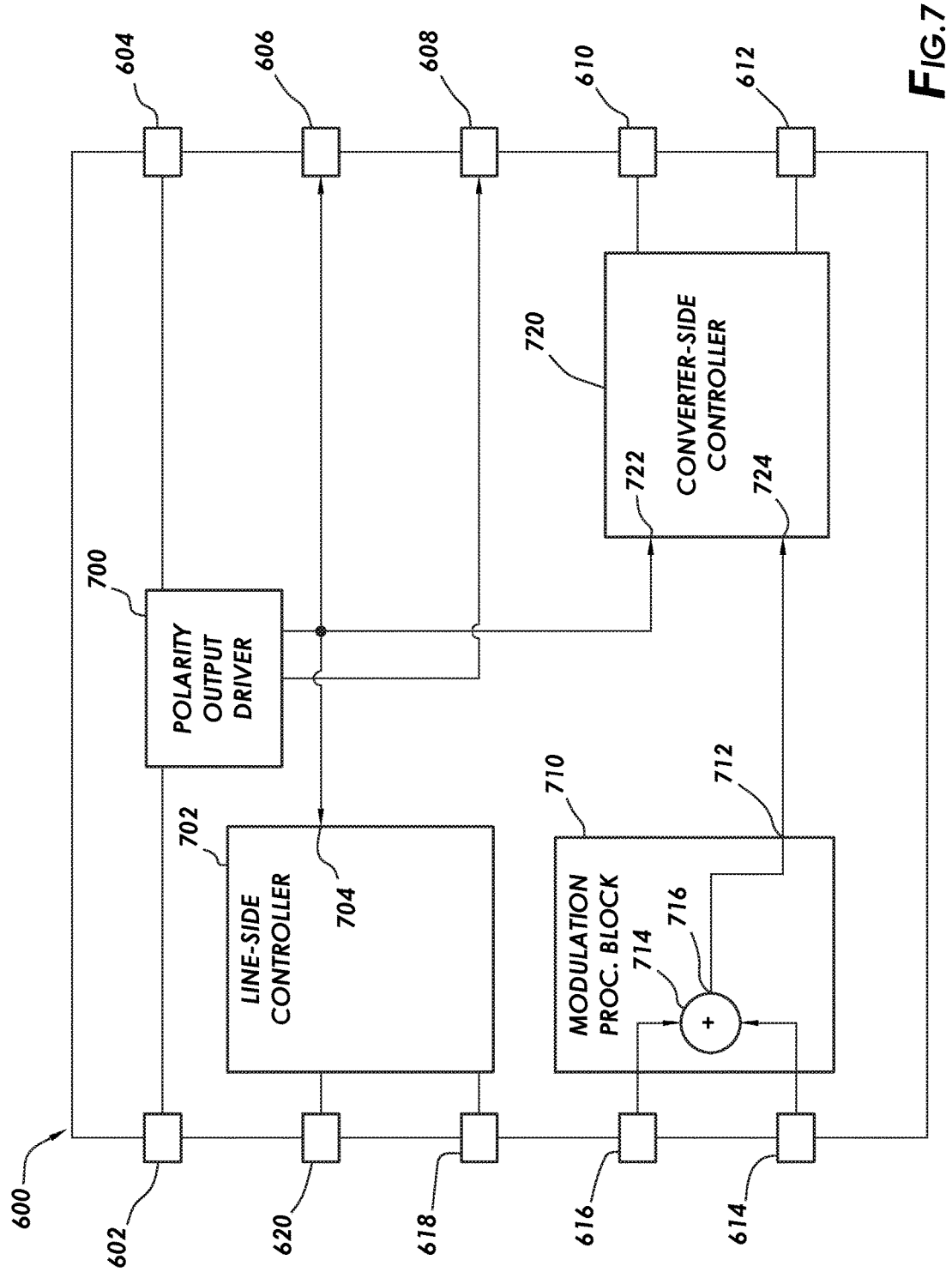

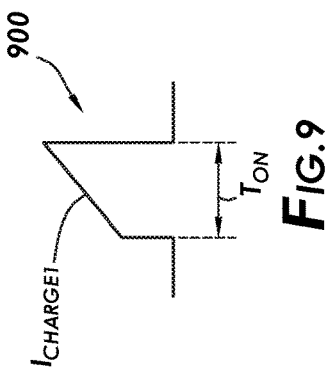
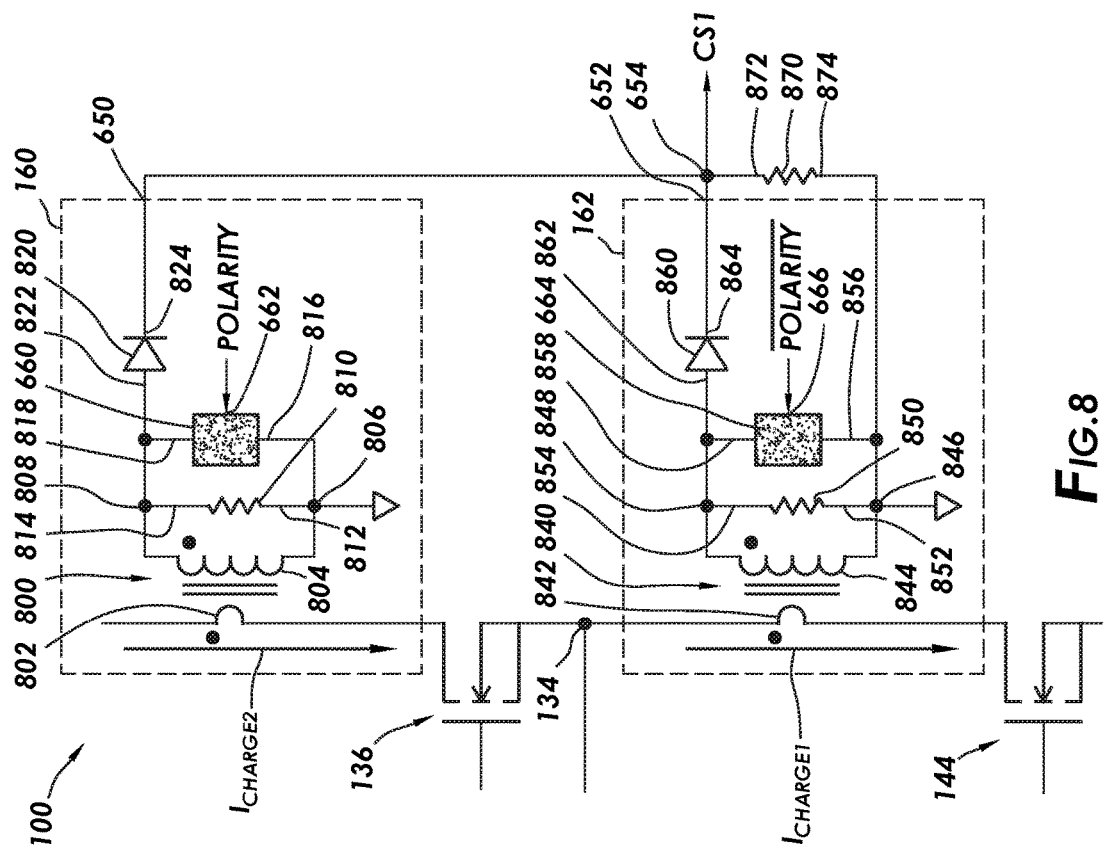

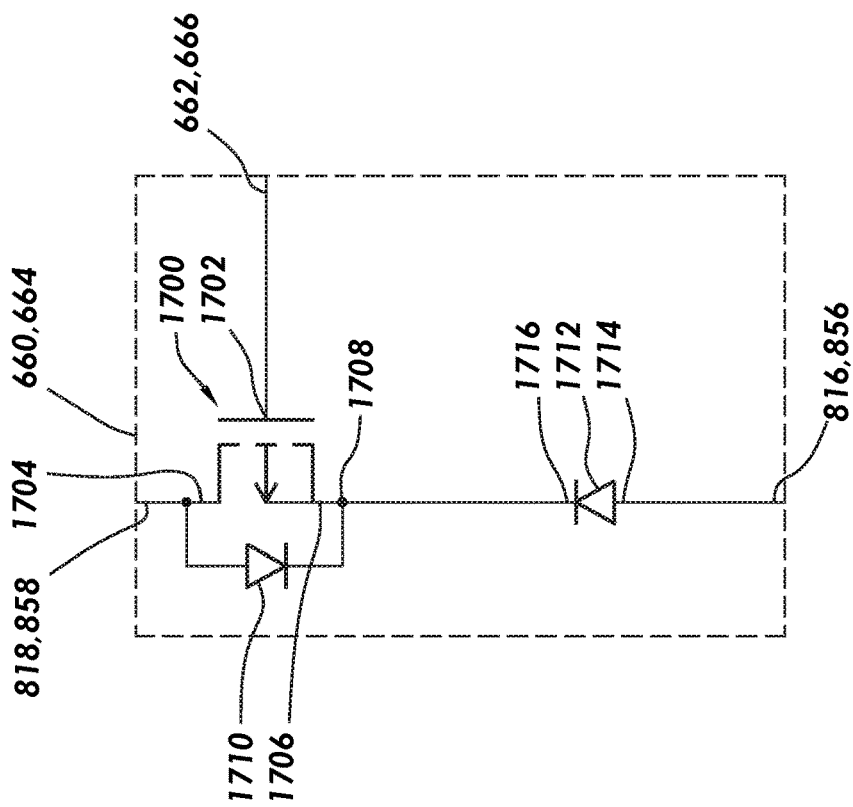
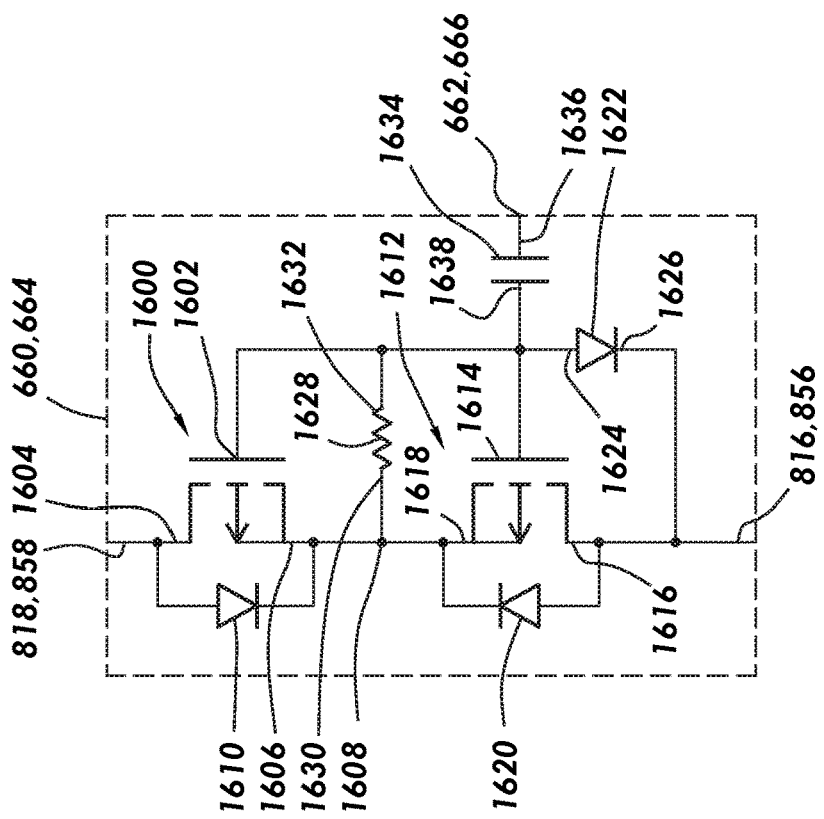

ns: 10,461,632 B1

CURRENT SENSING FOR BRIDGELESS PFC CONVERTERS

CROSS-REFERENCE TO RELATED APPLICATIONS

This application claims the benefit of U.S. Provisional Application No. 62/655,598 filed Apr. 10, 2018 titled "CURRENT SENSING TECHNIQUE FOR TOTEM POLE BRIDGELESS PFC." The provisional application is incorporated by reference herein as if reproduced in full below.

BACKGROUND

There is an ever increasing demand for power converters with better efficiency and smaller footprint. Recent attention in meeting the noted demands has focused on the rectifying bridge, and particular advances in bridgeless power factor correcting (PFC) converters. One of the difficulties in such designs is accurately sensing currents within the bridgeless PFC converter in such a way as to increase efficient operation of the bridgeless PFC converter. Any method or system that improves the accuracy of current sensing would provide a competitive advantage in the marketplace.

BRIEF DESCRIPTION OF THE DRAWINGS

For a detailed description of example embodiments, reference will now be made to the accompanying drawings in which:

FIG. 7 shows a block diagram of a PFC controller in accordance with at least some embodiments;

FIG. 8 shows an electrical schematic of a portion of a bridgeless PFC converter in accordance with at least some embodiments;

FIG. 9 shows a timing diagram of a charge current sense signal representing a charging current of an inductance within a bridgeless power factor correcting (PFC) converter in accordance with at least some embodiments;

FIG. 16 shows an electrical schematic of a switch within a bridgeless power factor correcting (PFC) converter in accordance with at least some embodiments;

FIG. 17 shows an electrical schematic of an alternative switch within a bridgeless power factor correcting (PFC) converter in accordance with at least some embodiments;

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, an application specific integrated circuit (ASIC) constructed, a microcontroller (with controlling software), a field programmable gate array (FPGA), or combinations thereof, configured to read signals and take action responsive to such signals.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to methods and systems of bridgeless power factor correction (PFC) converters (sometimes referred to as totem-pole bridgeless PFCs). More particularly, example embodiments are directed to methods of operating bridgeless PFCs in such a way as to accurately and efficiently measure charging and discharging currents using a simplified and consistent set of components. For example, charging and discharging currents are sensed using a current transformer (CT). More particularly still, in example embodiments the secondary winding of the CT is shorted when the CT is not actively used for sensing a charging current, thereby preventing that shorted CT from generating nuisance signals upon a charging current sense node which is used to control switching of the field effect transistors (FETs) to generate an output voltage of the converter. The specification first turns to an example bridgeless PFC converter to orient the reader.

Figure 1:
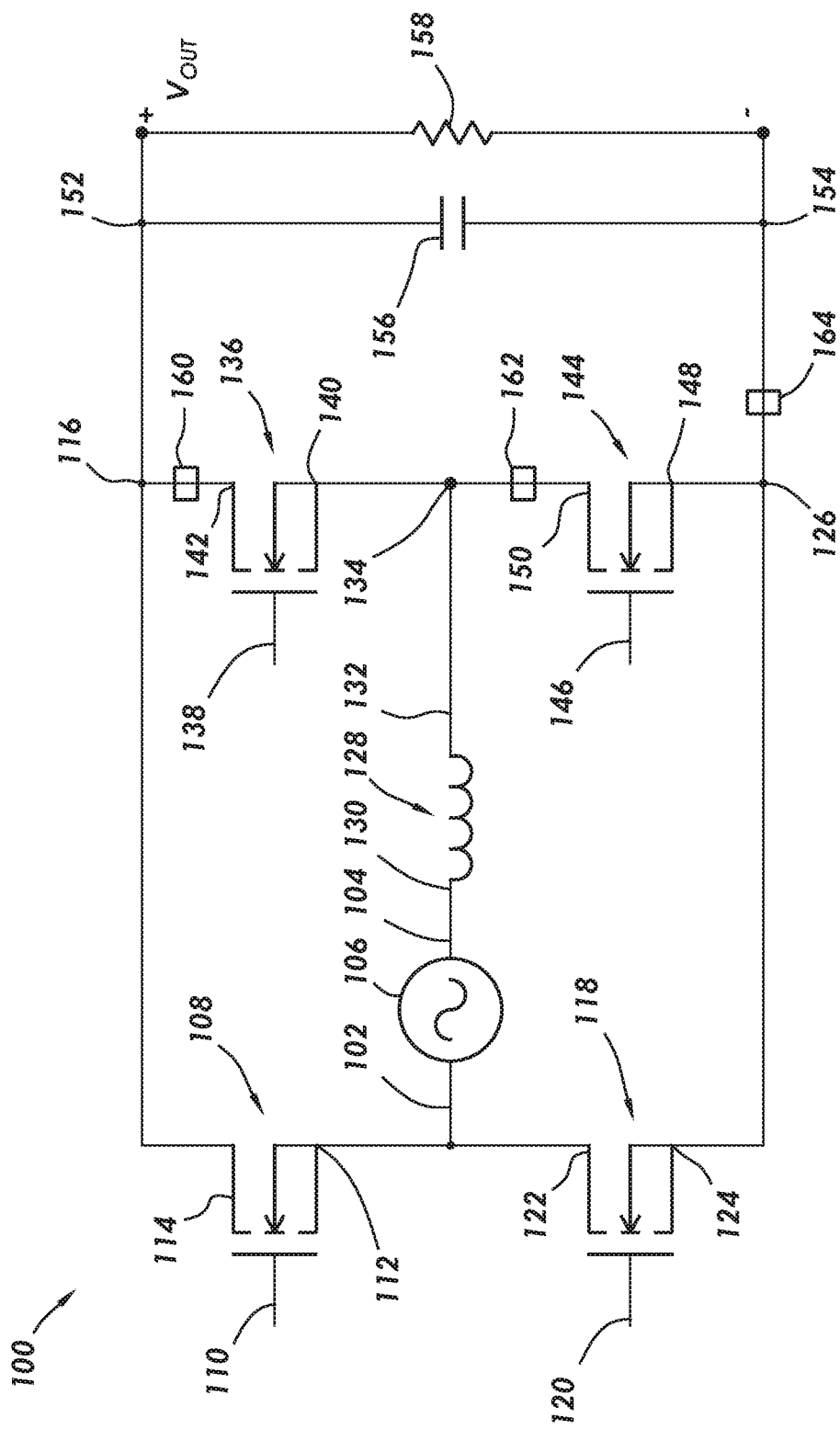
FIG. 1 shows an electrical schematic of a bridgeless power factor correcting (PFC) converter in accordance with at least some embodiments.

FIG. 1 shows a bridgeless PFC converter in accordance with at least some embodiments. In particular, FIG. 1 shows a bridgeless PFC converter 100 defining a first line input 102 and a second line input 104. An AC source 106 couples to the line inputs 102 and 104. In some cases, the AC source has a line frequency of 50 or 60 Hertz, and root mean square (RMS) voltages ranging from about 85 to about 265 $V_{RMS}$. The bridgeless PFC converter 100 further defines a slow leg high-side FET 108 defining a gate 110, a source 112 coupled to the first line input 102, and a drain 114 coupled to a positive node 116 of the bridgeless PFC converter 100. The bridgeless PFC converter 100 further defines a slow leg low-side FET 118 defining a gate 120, a drain 122 coupled to the first line input 102, and a source 124 coupled to a negative node 126. The slow leg high-side FET 108 is named based on its location in the drawing (e.g., upper portion), the fact that the slow leg high-side FET 108 is switched based on the line frequency of the AC source 106, and the fact that making slow leg high-side FET 108 fully conductive may involve driving the gate 110 to a voltage slightly higher than an output voltage $V_{OUT}$ of the converter 100. The slow leg low-side FET 118 is named based on its opposite location from slow leg high-side FET 108 within the drawing (e.g., lower portion), and the fact that the slow leg low-side FET 118 is switched based on the line frequency of the AC source 106. The FETs 108 and 118 are examples used in many cases; however, the FETs are representative of any device that may be used as an electrically controlled switch (e.g., transistors, junction transistors, Gallium nitride (GaN) High-electron-mobility transistors (HEMT), silicon carbide (SiC) devices, FETs of other types, and silicon controlled rectifiers).

The example bridgeless PFC converter 100 further comprises an inductance 128 that defines a first lead 130 coupled to the second line input 104, and a second lead 132 defining a switch node 134. In the example embodiment, the inductance 128 is provided by single-winding inductor. However, the inductance 128 may be provided as a multi-winding inductor or using one or more windings of a transformer.

The example bridgeless PFC converter 100 further comprises a fast leg high-side FET 136 defining a gate 138, a source 140 coupled to switch node 134, and a drain 142 coupled to the positive node 116. Also included is a fast leg low-side FET 144 defining a gate 146, a source 148 coupled to the negative output 126, and a drain 150 coupled to switch node 134. The fast leg high-side FET 136 is named based on its location in the drawing (e.g., upper portion), the fact that the fast leg high-side FET 136 is switched at a switching frequency higher than the line frequency of the AC source 106, and the fact that making fast leg high-side FET 136 fully conductive may involve driving the gate 138 to a voltage slightly higher than the $V_{OUT}$ of the converter. The fast leg low-side FET 144 is named based on its opposite location from fast leg high-side FET 136 within the drawing (e.g., lower portion), and the fact that the fast leg low-side FET 144 is switched at a switching frequency higher than the line frequency of the AC source 106. The FETs 136 and 144 are examples used in most cases; however, the FETs 136 and 144 are representative of any device that may be used as an electrically controlled switch (e.g., transistors, junction transistors, GaN HEMTs, SiC devices, FETs of other types, and silicon controlled rectifiers).

The example bridgeless PFC controller 100 defines a positive output 152 coupled to the positive node 116 and a negative output 154 coupled to the negative node 126. In example systems, the positive output 152 and negative output 154 define the output voltage $V_{OUT}$ of the bridgeless PFC converter 100. The example bridgeless PFC converter 100 further comprises a smoothing or output capacitor 156 coupled across the positive output 152 and the negative output 154. The output capacitor 156 smoothes the output voltage, and stores and provides charge during periods of time when the inductance 128 is in the charge mode (discussed more below). In some cases the output voltage $V_{OUT}$ may be 400 Volts DC across the entire example AC source voltage range of 85 to 265 $V_{RMS}$, but other output voltages are possible. The bridgeless PFC converter 100 thus supplies power to a load coupled across positive output 152 and the negative output 154, with an example load shown as resistor 158. However, in some cases the load may be a further power converter, such as a flyback converter designed and constructed to convert the 400 VDC created by the bridgeless PFC converter to a lower voltage suitable for downstream electronics (e.g., 20 Volts, 12 Volts, or 5 Volts).

The example bridgeless PFC converter 100 further comprises a high-side current sensor 160 configured to sense current through the fast leg high-side FET 136, a low-side current sensor 162 configured to sense current through the fast leg low-side FET 144, and a discharge current sensor 164 configured to sense the current between the positive node 116 and the positive output 152 or the current between the negative node 126 and the negative output 154. The current sensors are discussed in greater detail below.

Operation of the example bridgeless PFC converter 100 can be conceptually divided into two broad categories: a positive half-line cycle of the AC source 106; and a negative half-line cycle of the AC source 106. In the positive half-line cycle, the AC source 106 has a polarity such that the voltage at the second line input 104 is higher than the first line input 102. Oppositely, in the negative half-line cycle, the AC source 106 has a polarity such that the voltage at the first line input 102 is higher than the voltage at the second line input 104. The designations as "positive" or "negative" are arbitrary, but selected and used consistently to avoid confusion.

During the positive half-line cycle, the slow leg high-side FET 108 is non-conductive and the slow leg low-side FET 118 is conductive. Assuming that the AC source 106 has a line frequency of 60 Hertz, the slow leg high-side FET 108 stays non-conductive in the positive half-line cycle for $\frac{1}{120}$th of a second and the slow leg low-side FET 118 stays conductive for the same $\frac{1}{120}$th of a second. During the negative half-line cycle, the slow leg high-side FET 108 is conductive and the slow leg low-side FET 118 is non-conductive. Assuming again that the AC source 106 has a line frequency of 60 Hertz, the slow leg high-side FET 108 stays conductive in the negative half-line cycle for 1/120th of a second and the slow leg low-side FET 118 stays non-conductive for the same 1/120th of a second. The conductive and non-conductive states of the FETs 108 and 118 thus swap back and forth with each polarity change of the voltage of the AC source 106.

Within each conceptual division (e.g., positive half-line cycle and negative half-line cycle), the bridgeless PFC converter 100 has two possible states: charging the inductance 128 (sometimes referred to as charge mode); and discharging the inductance 128 (sometimes referred to a discharge mode). The specification now turns to operation of the bridgeless PFC converter 100 by way of a series of figures. In each figure, FETs that are conductive are shown as closed switch contacts, and FETs that are non-conductive are shown as open switch contacts.

Figure 2:
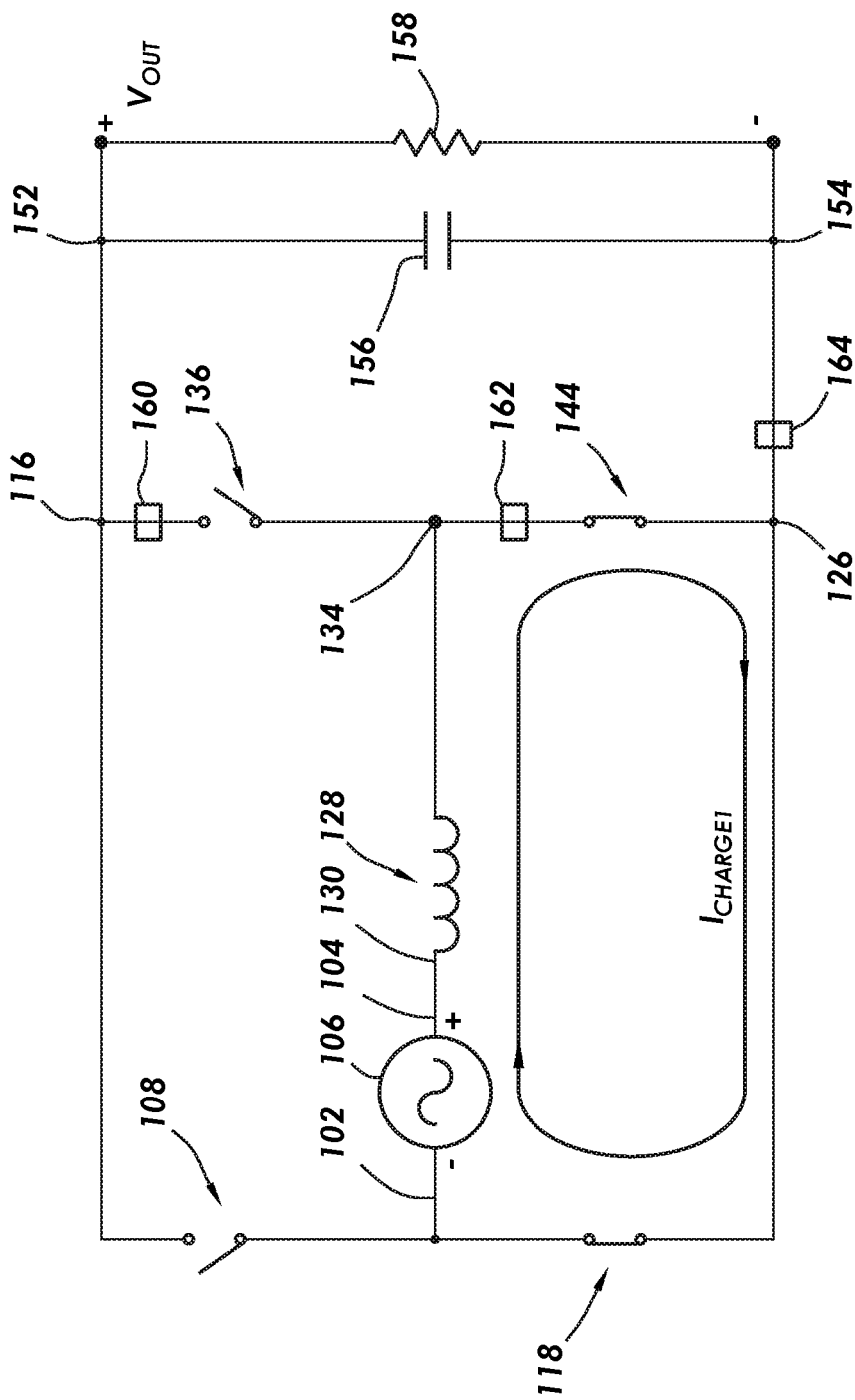
FIG. 2 shows an electrical schematic of a bridgeless PFC converter during a positive half-line cycle and during charging of the inductance, in accordance with at least some embodiments.

FIG. 2 shows an electrical schematic of a bridgeless PFC converter during a positive half-line cycle and during charging of the inductance, in accordance with at least some embodiments. In particular, during the positive half-line cycle the slow leg high-side FET 108 is non-conductive (shown as an open switch contact), and the slow leg low-side FET 118 is conductive (shown as a closed switch contact). The example bridgeless PFC converter 100 of FIG. 2 is shown charging the inductance 128, and thus fast leg high-side FET 136 is non-conductive (shown as an open switch contact), and fast leg low-side FET 144 is conductive (shown as a closed switch contact). The configuration shown results in a first charging current $I_{CHARGE1}$ flowing through the inductance 128, the first charging current $I_{CHARGE1}$ has a first polarity (e.g., resulting in a positive voltage at the first lead 130 with respect to the switch node 134). Assuming steady state operation, during the charging of the inductance 128, the output voltage $V_{OUT}$ is supplied by the output capacitor 156. The first charging current $I_{CHARGE1}$ creates and stores energy in the field surrounding the inductance 128. Still during the example positive half-cycle, the bridgeless PFC converter 100 then transitions to discharging the inductance 128.

Figure 3:
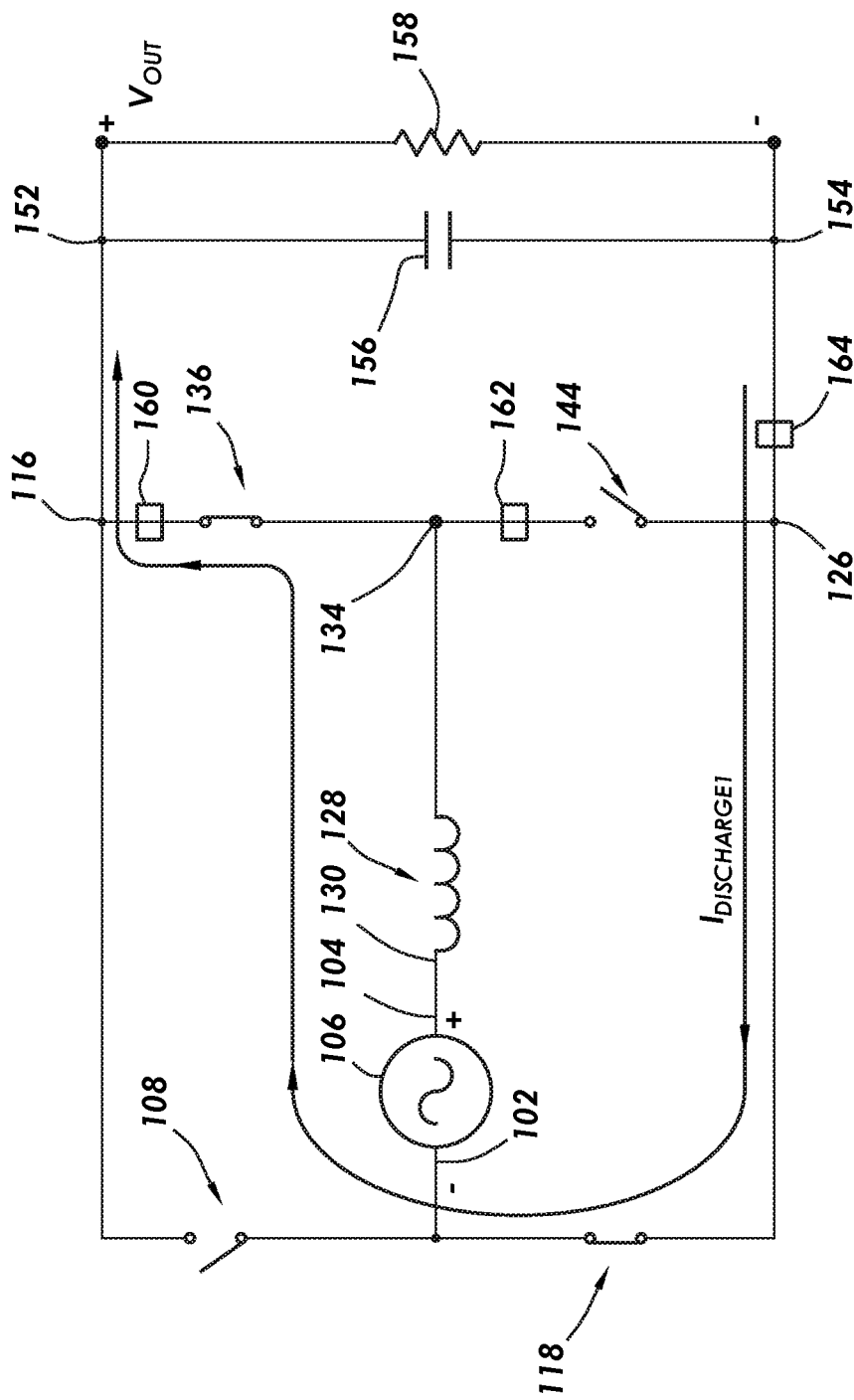
FIG. 3 shows an electrical schematic of a bridgeless PFC converter during a positive half-line cycle and during discharging of the inductance, in accordance with at least some embodiments.

FIG. 3 shows an electrical schematic of a bridgeless PFC converter during a positive half-line cycle and during discharging of the inductance 128, in accordance with at least some embodiments. In particular, again during the positive half-line cycle the slow leg high-side FET 108 is non-conductive, and the slow leg low-side FET 118 is conductive. The example bridgeless PFC converter 100 of FIG. 2 is shown discharging the inductance 128, and thus fast leg high-side FET 136 is conductive (shown as a closed switch contact), and fast leg low-side FET 144 is non-conductive (shown as an open switch contact). Because the current through inductance cannot change instantaneously, when the bridgeless PFC converter 100 transitions to discharging the inductance 128, a first discharge current $I_{DISCHARGE1}$ flows through the inductance 128, and the first discharge current $I_{DISCHARGE1}$ has the first polarity. More particularly, the first discharge current $I_{DISCHARGE1}$ flows to the first lead of the output capacitor 156 and/or the positive output 152 of the output voltage $V_{OUT}$. Thus, during the discharge mode the first discharge current $I_{DISCHARGE1}$ supplies the output voltage and current, and re-charges the output capacitor 156.

During the example positive half-line cycle, the bridgeless PFC converter 100 switches back and forth between the charge mode and discharge mode to supply the output voltage $V_{OUT}$. More particularly, example embodiments operate the bridgeless PFC converter 100 in a continuous conduction mode in which the inductor 128 is switched between the charge mode and the discharge mode without the current through the inductor reaching zero. Stated otherwise, when the bridgeless PFC converter 100 is operated in the continuous conduction mode during a half-line cycle, the first discharge current $I_{DISCHARGE1}$ does not reach zero before the next charge mode begins.

Still considering the example positive half-line cycle of FIGS. 2 and 3, the inductance 128, fast leg high-side FET 136 and fast leg low-side FET 144 thus form a non-isolated boost converter, boosting the voltage of the AC source 106 to create the output voltage $V_{OUT}$.

Figure 4:
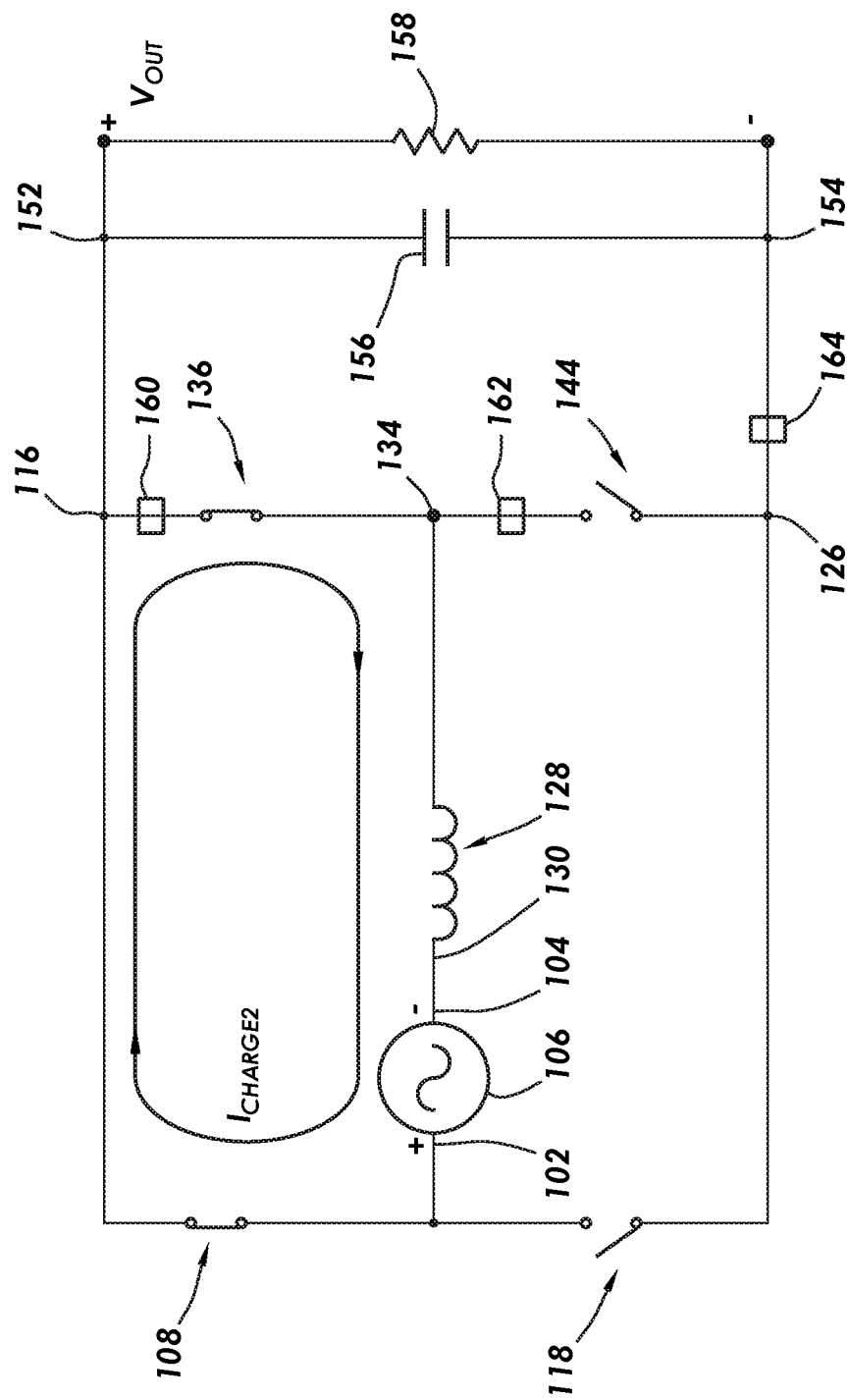
FIG. 4 shows an electrical schematic of a bridgeless PFC converter during a negative half-line cycle and during charging of the inductance, in accordance with at least some embodiments.
Figure 5:
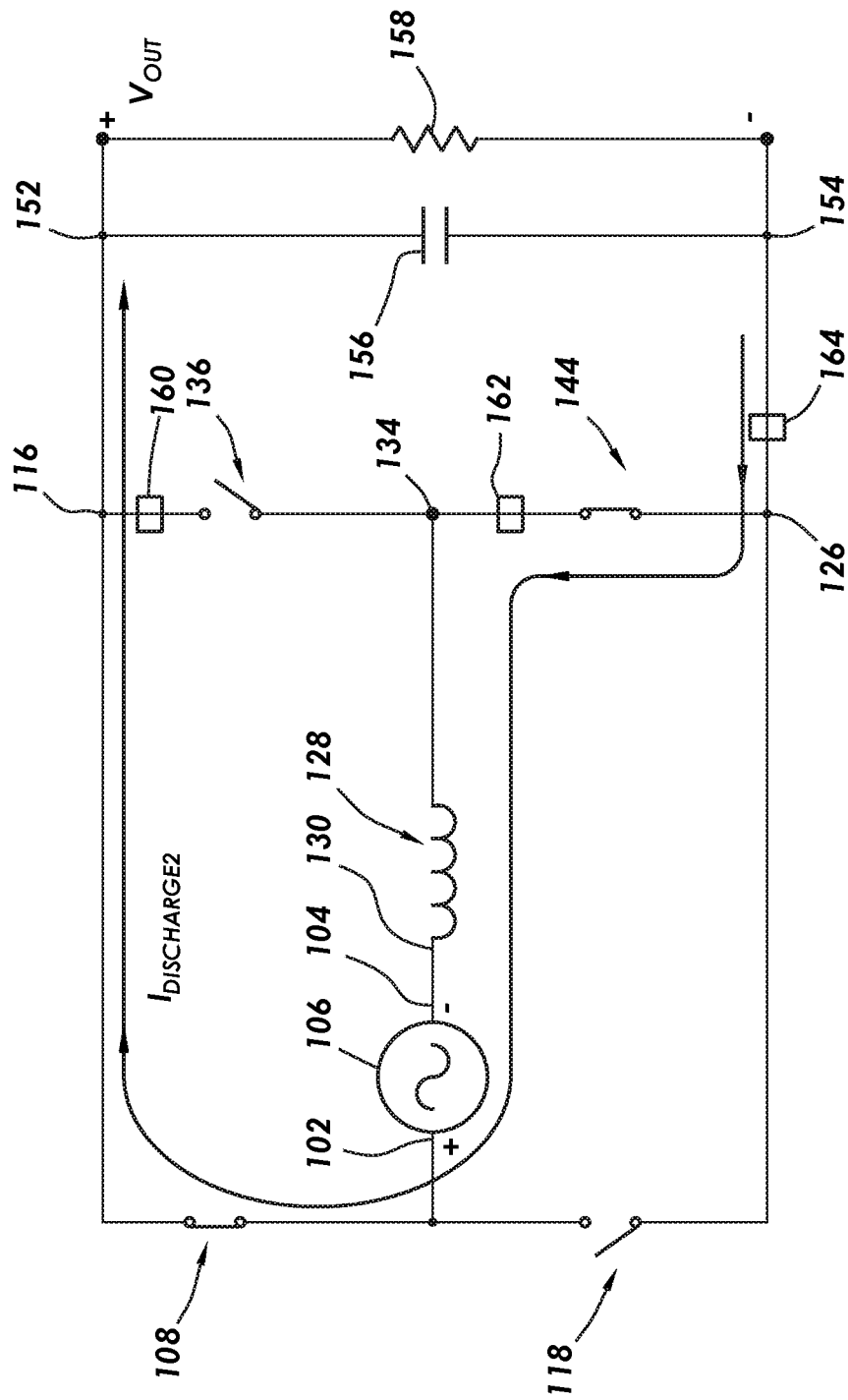
FIG. 5 shows an electrical schematic of a bridgeless PFC converter during a negative half-line cycle and during discharging of the inductance, in accordance with at least some embodiments.

FIGS. 4 and 5 show the charging current $I_{CHARGE2}$, and the discharge current $I_{DISCHARGE2}$ within the bridgeless PFC converter 100 and with respect to the negative half-line cycle of the AC source 106. More precisely, during periods of time when the voltage impressed on the second line input 104 by the AC source 106 is lower than the voltage impressed on the first line input 102.

The various embodiments of the bridgeless PFC converter 100 discussed to this point have assumed but not expressly shown the presence of a PFC controller controlling the various FETs, and monitoring the various signals. The specification now turns to a more detailed description of a bridgeless PFC converter including a PFC controller.

Figure 6:
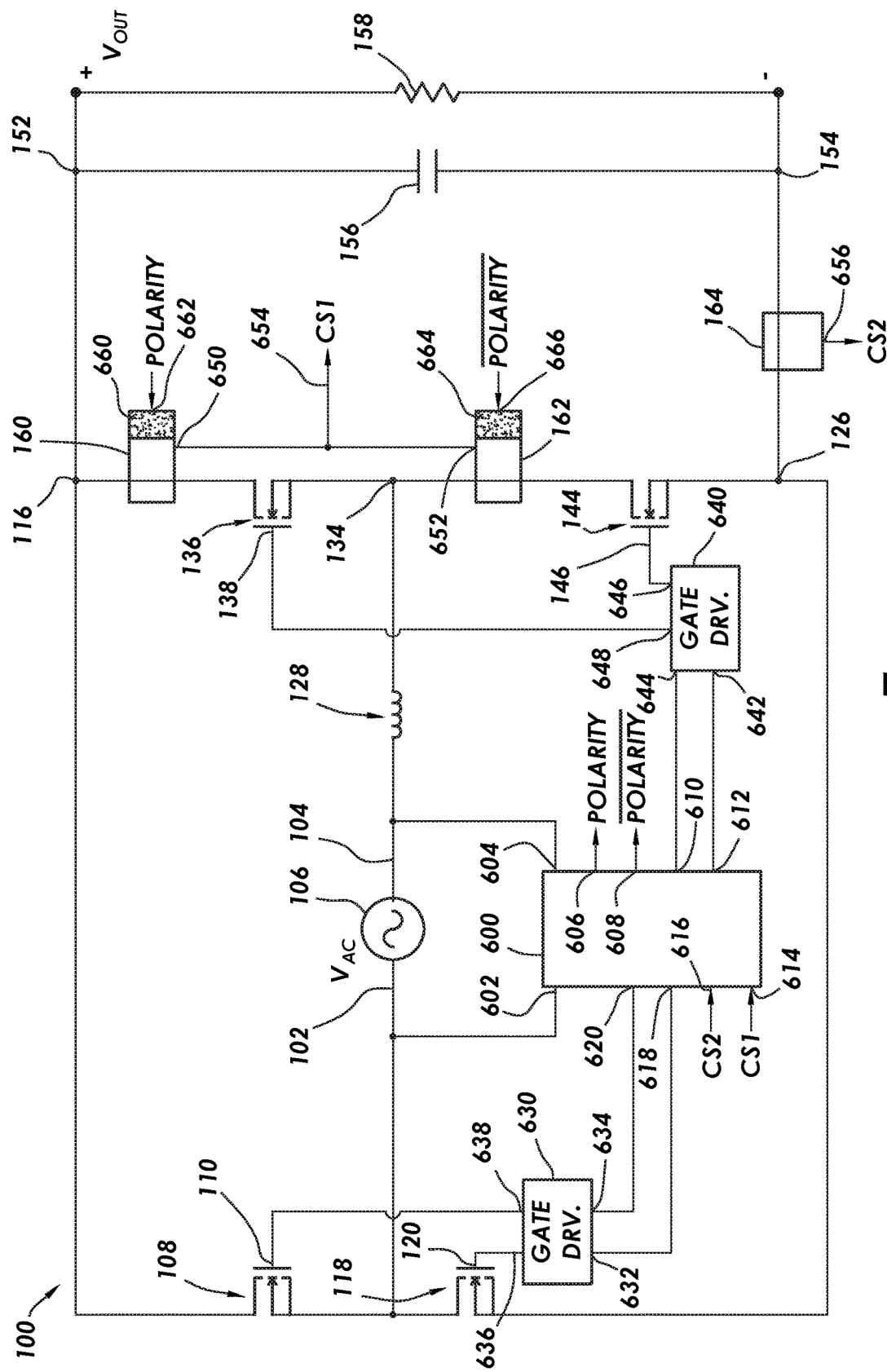
FIG. 6 shows a partial schematic, partial block diagram, of a bridgeless PFC converter in accordance with at least some embodiments.

FIG. 6 shows a partial schematic, partial block diagram, of a bridgeless PFC converter 100 in accordance with at least some embodiments. In particular, FIG. 6 shows many of the same components introduced in FIG. 1, and those components carry the same reference numbers and will not be re-introduced with respect to FIG. 6. FIG. 6 expressly shows PFC controller 600 within the overall bridgeless PFC converter 100. The example PFC controller 600 is a packaged integrated circuit (IC) having a plurality of terminals electrically exposed on an outside surface of the packaged IC. In some example systems, the packaged IC is a 20 pin dual in-line package (DIP), but any suitable packaging may be used. The example PFC controller 600 defines a first line sense terminal 602, a second line sense terminal 604, a polarity output terminal 606 a polarity-bar output terminal 608, a fast leg high-side terminal 610, a fast leg low-side terminal 612, a first current sense terminal 614, a second current sense terminal 616, a slow leg low-side terminal 618, and a slow leg high-side terminal 620. Additional terminals will be present (e.g., power, ground or common), but the additional terminals are omitted so as not to unduly complicate the figure.

The example bridgeless PFC converter 100 includes the first line sense terminal 602 of the PFC controller 600 coupled to the first line input 102 of the AC source 106, and the second line sense terminal 604 of the PFC controller 600 coupled to the second line input 104 of the AC source 106. While FIG. 6 shows terminals 602 and 604 coupled directly to the line inputs 102 and 104, respectively, in practice the connections may include voltage dividers to lower the voltages applied to the PFC controller 600 from the AC source 106. Additionally or alternatively, the connections between the line inputs 102 and 104 and the terminals 602 and 604 may include current-limiting resistors to lower the current supplied to the PFC controller 600 from the AC source 106.

In some embodiments, the PFC controller 600 is configured to assert the polarity output terminal 606 in response to the AC source 106 being in the positive half-line cycle and to de-assert the polarity output terminal 606 in response to the AC source 106 being in the negative half-line cycle. Alternatively, the PFC controller 600 may be configured to assert the polarity output terminal 606 in response to the AC source 106 being in the negative half-line cycle and to de-assert the polarity output terminal 606 in response to the AC source 106 being in the positive half-line cycle. In the example embodiment, the polarity-bar output terminal 608 is configured as an inverse of the polarity output terminal 606. In other words, the PFC controller 600 is configured to assert the polarity-bar output terminal 608 only when the polarity output terminal 606 is de-asserted.

While in some cases the PFC controller 600 may be able to directly drive the gates of the FETs, example embodiments use a slow leg gate driver 630 to perform the task with respect to the slow leg high-side FET 108 and slow leg low-side FET 118. Example embodiments also use a fast leg gate driver 640 to perform the task with respect to the fast leg high-side FET 136 and the fast leg low-side FET 144. The example slow leg gate driver 630 defines a slow leg low-side input 632, a slow leg high-side input 634, a slow leg low-side output 636, and a slow leg high-side output 638. The slow leg low-side input 632 couples to the slow leg low-side terminal 618. The slow leg high-side input 634 couples to the slow leg high-side terminal 620. The slow leg low-side output 636 couples to gate 120 of slow leg low-side FET 118. The slow leg high-side output 638 couples to gate 110 of the slow leg high-side FET 108. The slow leg gate driver 830 makes the slow leg FETs 108 and 118 conductive and non-conductive responsive to signals driven to the slow leg terminals 618 and 620 of the PFC controller 600.

The example fast leg gate driver 640 defines a fast leg low-side input 642, fast leg high-side input 644, a fast leg low-side output 646, and a fast leg high-side output 648. The fast leg low-side input 642 couples to the fast leg low-side terminal 612. The fast leg high-side input 644 couples to the fast leg high-side terminal 610. The fast leg high-side output 648 couples to the gate 138 of the fast leg high-side FET 136. The fast leg low-side output 646 couples to gate 146 of the fast leg low-side FET 144. The fast leg gate driver 640 makes the fast leg FETs 136 and 144 conductive and non-conductive responsive to signals driven to the fast leg terminals 610 and 612 of the PFC controller 600.

Still referring to FIG. 6, the high-side current sensor 160 defines a high-side current output 650 and the low-side current sensor 162 defines a low-side current output 652. The high-side current sensor 160 includes a high-side switch 660 defining a high-side command input 662, and which is configured to selectively enable the high-side current sensor 160 to generate a signal upon the high-side current output 650. The high-side command input 662 is connected to the polarity output terminal 606 of the PFC controller 600 as indicated by the common label "POLARITY". The low-side current sensor 162 includes a low-side switch 664 defining a low-side command input 666, and which is configured to selectively enable the high-side current sensor 160 to generate a signal upon the low-side current output 652. The low-side command input 666 is connected to the polarity-bar output terminal 608 of the PFC controller 600 as indicated by the common label "POLARITY".

In the example embodiment, each of the high-side current output 650 and the low-side current output 652 are coupled to a charging current sense node 654, which is coupled to the first current sense terminal 614 of the PFC controller 600, as indicated by the common reference symbol "CS1". Similarly, the discharge current sensor 164 defines a discharge current sense node 656 coupled to the second current sense terminal 616 of the PFC controller 600, as indicated by the common reference symbol "CS2".

FIG. 7 shows a block diagram of the PFC controller 600 in accordance with at least some embodiments. The functionality of the PFC controller 600 may be conceptually, though not necessarily physically, divided into a polarity output driver 700, a line-side controller 702, a modulation processing block 710, and a converter-side controller 720.

The example polarity output driver 700 is coupled to the first line sense terminal 602, the second line sense terminal 604, the polarity output terminal 606, and the polarity-bar output terminal 608. The polarity output driver 700 is configured to sense polarity of the AC source 102 by way of the first line sense terminal 602 and the second line sense terminal 604, and polarity output driver 700 is configured to assert the polarity output terminal 606 and de-assert the polarity-bar output terminal 608 when the polarity is positive (e.g., higher voltage on the second line input 104 than the first line input 102). Further, the polarity output driver 700 is configured to assert the polarity-bar output terminal 608 and de-assert the polarity output terminal 606 when the polarity is negative (e.g., higher voltage on the first line input 102 than the second line input 104).

The example line-side controller 702 is coupled to the slow leg high-side terminal 620, and the slow leg low-side terminal 618. The line-side controller 702 includes a polarity input 704 connected to the polarity output terminal 606 for receiving the polarity of the AC source 102. Alternatively or additionally, the line-side controller 702 may receive an input signal from the polarity output driver 700 via an input connected to the polarity-bar output terminal 608. Alternatively the polarity output driver 700 may communicate one or more polarity signals directly to the line-side controller 702. The line-side controller 702 is configured to assert the slow leg low-side terminal 618 and de-assert the slow leg high-side terminal 620 when the polarity is positive (e.g., higher voltage on the second line input 104 than the first line input 102). Further, the line-side controller 702 is configured to assert the slow leg high-side terminal 620 and de-assert the slow leg low-side terminal 618 when the polarity is negative (e.g., higher voltage on the first line input 102 than the second line input 104).

The modulation processing block 710 of the example PFC controller 600 defines a modulation output 712. The modulation processing block 710 includes a summing block 714 coupled to each of the first current sense terminal 614 and the second current sense terminal 616. The summing block 714 is configured to additively combine the current signals from each of the first and the second current sense terminals, 614, 616, which are representative of the charging currents $I_{CHARGE1}$, $I_{CHARGE2}$ and the discharge currents $I_{DISCHARGE1}$, $I_{DISCHARGE2}$ of the inductance 128, respectively. The summing block 714 is configured to generate an output signal upon a summing output 716, which is subsequently communicated to the converter-side controller 720 via the modulation output 712. In practice, the modulation processing block 710 may combine other signals and/or functions, such as scaling factors, offsets, and/or smoothing with the summing output 716 to drive the modulation output 712, but those other signals and/or functions are omitted from FIG. 7 for the sake of simplicity.

The converter-side controller 720 defines a polarity input 722 connected to the polarity output terminal 606 for receiving the polarity of the AC source 102. Alternatively or additionally, the converter-side controller 720 may receive a polarity signal via an input connected to the polarity-bar output terminal 608. Alternatively the polarity output driver 700 may communicate one or more polarity signals directly to the converter-side controller 720. The converter-side controller 720 also defines a modulation input 724, which is coupled to the modulation output 712 of the modulation processing block 710.

The converter-side controller 720 is also connected to the fast leg high-side terminal 610, and the fast leg low-side terminal 612. During the positive half-line cycle, the converter-side controller 720 places the converter 100 in the charge and discharge modes to supply the output voltage $V_{OUT}$. That is, the converter-side controller 720 charges the inductance 128 through the fast leg low-side FET 144 by asserting the fast leg low-side terminal 612 and de-asserting the fast leg high-side terminal 610. The converter-side controller 720 then places the converter in the discharge mode and discharges the inductance 128 through the fast leg high-side FET 136 by asserting the fast leg high-side terminal 610 and de-asserting the fast leg low-side terminal 612.

During a negative half-line cycle, the converter-side controller 720 places the converter 100 in the charge and discharge modes to supply the output voltage $V_{OUT}$. That is, the converter-side controller 720 charges the inductance 128 through the fast leg high-side FET 136 by asserting the fast leg high-side terminal 610 and de-asserting the fast leg low-side terminal 612. The converter-side controller 720 places the converter in the discharge mode and discharges the inductance 128 through the fast leg low-side FET 144.

The converter-side controller 720 is configured to switch between the charge and the discharge modes using a pulse width modulation (PWM) control strategy with the bridgeless PFC converter 100 in the charge mode for a charging time interval $T_{ON}$ and with the bridgeless PFC converter 100 in the discharge mode for a discharging time interval $T_{OFF}$. The charging time interval $T_{ON}$ is inversely proportional to the average inductor current as communicated via the modulation output 712. This control strategy is described in publication HBD853/D Rev. 5 (April 2014) by ON Semiconductor, which is hereby incorporated by reference in its entirety. This control strategy, therefore, depends upon accurate measurement of both the charging currents $I_{CHARGE1}$, $I_{CHARGE2}$ and the discharge currents $I_{DISCHARGE1}$, $I_{DISCHARGE2}$ of the inductance 128.

FIG. 8 shows an electrical schematic of a portion of the bridgeless PFC converter 100 in accordance with at least some embodiments. Specifically, FIG. 8 includes detailed schematics of each of the high-side current sensor 160 and the low-side current sensor 162 in accordance with some embodiments. In the example embodiment of FIG. 8, the high-side current sensor 160 includes a high-side current transformer (CT) 800 including a primary winding 802 and a secondary winding 804. A polarity dot adjacent to the secondary winding 804 indicates the side of the secondary winding 804 from which current is sourced when current enters the primary winding 802 at the side indicated by the dot adjacent the primary winding 802. The primary winding 802 is configured to measure the second charging current $I_{CHARGE2}$ through the fast leg high-side FET 136. The secondary winding 804 generates an output current from a reference node 806 to a high-side sense node 808, with the output current proportional to the second charging current $I_{CHARGE2}$. The reference node 806 is connected to a signal ground. The example high-side current sensor 160 also includes a high-side reset resistor 810 defining a first resistor lead 812 and a second resistor lead 814. The first and second resistor leads 812, 814 are connected to the reference node 806 and the high-side sense node 808, respectively. The high-side current sensor 160 also includes a high-side rectifier 820 defining a first rectifier lead 822 and a second rectifier lead 824. The first rectifier lead 822 is connected to the high-side sense node 808 and the second rectifier lead 824 is connected to the charging current sense node 654. More specifically, the high-side rectifier 820 shown in FIG. 8 is configured to conduct current from the high-side sense node 808 to the charging current sense node 654 while blocking current flow in an opposite direction. In at least some embodiments, and as shown in FIG. 8, high-side rectifier 820 includes a single diode, but other rectifier arrangements may be used (e.g. a switching rectifier).

The high-side current sensor 160 also includes the high-side switch 660. Specifically, the high-side switch 660 defines a first switch lead 816 and a second switch lead 818, which are connected to the reference node 806 and the high-side sense node 808, respectively. The high-side switch 660 is configured to selectively conduct current between the first and second switch leads 816, 818 in response to assertion of the high-side command input 662. In other words, the high-side switch 660 selectively shorts the secondary winding 804 of the high-side CT 800 in response to assertion of the high-side command input 662.

When the high-side switch 660 is in a non-conductive state (i.e. when the high-side switch 660 is not shorting the secondary winding 804), a sense current proportional to the second charging current $I_{CHARGE2}$ flows from the high-side sense node 808 through the high-side rectifier 820 and generates a voltage on current signal resistor 870 (i.e. the voltage shown in FIG. 9). During this period, a magnetizing current builds in the high-side CT 800. Once the second charging current $I_{CHARGE2}$ stops flowing through the high-side primary winding 802, a magnetizing current flows through the high-side reset resistor 810 to generate a short duration negative voltage at the high-side sense node 808 which resets the high-side CT 800 in accordance with volt-second balance principle.

The high-side current sensor 160 may be influenced by effects not related to the second charging current $I_{CHARGE2}$. For example, the first discharge current $I_{DISCHARGE1}$ flowing through the high-side primary winding 802 of high-side CT 800 in a direction opposite the flow of the second charging current $I_{CHARGE2}$ causes a secondary current through the high-side reset resistor 810 in a direction from the high-side reference node 806 to the high-side sense node 808. As a result, a magnetizing current builds in the high-side CT 800 opposite the direction of the magnetizing current induced by the second charging current $I_{CHARGE2}$. Once the first discharge current $I_{DISCHARGE1}$ stops flowing through the high-side primary winding 802, the magnetizing current continues to flow through the high-side rectifier 820 and generates a small positive voltage across the current signal resistor 870. This small positive voltage represents a nuisance signal, which corrupts or distorts a current sense voltage that the low-side CT 162 generates across the current signal resistor 870. Such nuisance signals may be reduced or eliminated by short-circuiting the secondary winding 804 of the high-side CT 800 at times when the second charging current $I_{CHARGE2}$ is not flowing (e.g. during the positive half-line cycle and/or during the discharging time interval $T_{OFF}$).

In the example embodiment of FIG. 8, the low-side current sensor 162 includes a low-side current transformer (CT) 840 including a primary winding 842 and a secondary winding 844. A polarity dot adjacent to the secondary winding 844 indicates the side of the secondary winding 844 from which current is sourced when current enters the primary winding 842 at the side indicated by the dot adjacent the primary winding 842. The primary winding 842 is configured to measure the first charging current $I_{CHARGE1}$ through the fast leg low-side FET 144. The secondary winding 844 generates an output current from a reference node 846 to a low-side sense node 848, with the output current proportional to the first charging current $I_{CHARGE1}$. The reference node 846 is connected to a signal ground. The example low-side current sensor 162 also includes a low-side reset resistor 850 defining a first resistor lead 852 and a second resistor lead 854. The first and second resistor leads 852, 854 are connected to the reference node 846 and the low-side sense node 848, respectively. The low-side current sensor 162 also includes a low-side rectifier 860 defining a first rectifier lead 862 and a second rectifier lead 864. The first rectifier lead 862 is connected to the low-side sense node 848 and the second rectifier lead 864 is connected to the charging current sense node 654. More specifically, the low-side rectifier 860 shown in FIG. 8 is configured to conduct current from the low-side sense node 848 to the charging current sense node 654 while blocking current flow in an opposite direction. In at least some embodiments, and as shown in FIG. 8, low-side rectifier 860 includes a single diode, but other rectifier arrangements may be used (e.g. a switching rectifier).

The low-side current sensor 162 also includes the low-side switch 664. Specifically, the low-side switch 664 defines a first switch lead 856 and a second switch lead 858, which are connected to the reference node 846 and the low-side sense node 848, respectively. The low-side switch 664 is configured to selectively conduct current between the first and second switch leads 856, 858 in response to assertion of the low-side command input 666. In other words, the low-side switch 664 selectively shorts the secondary winding 844 of the low-side CT 840 in response to assertion of the low-side command input 666.

When the low-side switch 664 is in a non-conductive state (i.e. when the low-side switch 664 is not shorting the secondary winding 844), a sense current proportional to the first charging current $I_{CHARGE1}$ flows from the low-side sense node 848 through the low-side rectifier 860 and generates a voltage on current signal resistor 870 (i.e. the voltage shown in FIG. 9). During this period, a magnetizing current builds in the low-side CT 840. Once the first charging current $I_{CHARGE1}$ stops flowing through the low-side primary winding 842, a magnetizing current flows through the low-side reset resistor 850 to generate a short duration negative voltage at the low-side sense node 848 which resets the low-side CT 840 in accordance with volt-second balance principle.

The low-side current sensor 162 may be influenced by effects not related to the first charging current $I_{CHARGE1}$. For example, the second discharge current $I_{DISCHARGE2}$ flowing through the low-side primary winding 842 of low-side CT 840 in a direction opposite the flow of the first charging current $I_{CHARGE1}$ causes a secondary current through the low-side reset resistor 850 in a direction from the low-side reference node 846 to the low-side sense node 848. As a result, a magnetizing current builds in the low-side CT 840 opposite the direction of the magnetizing current induced by the first charging current $I_{CHARGE1}$. Once the second discharge current $I_{DISCHARGE2}$ stops flowing through the low-side primary winding 842, the magnetizing current continues to flow through the low-side rectifier 860 and generates a small positive voltage across the current signal resistor 870. This small positive voltage represents a nuisance signal, which corrupts or distorts a current sense voltage that the high-side CT 160 generates across the current signal resistor 870. Such nuisance signals may be reduced or eliminated by short-circuiting the secondary winding 844 of the low-side CT 840 at times when the first charging current $I_{CHARGE1}$ is not flowing (e.g. during the negative half-line cycle and/or during the discharging time interval $T_{OFF}$).

Still referring to FIG. 8, the example bridgeless PFC converter 100 also includes a current signal resistor 870 defining a first resistor lead 872 and a second resistor lead 874. The first resistor lead 872 is connected to the charging current sense node 654 and the second resistor lead 874 is connected to a signal ground. The current signal resistor 870 may, therefore, function to pull-down the charging current sense node 654 to match the 0V potential of the signal ground when the charging current sense node 654 is not energized by either of the high-side current sensor 160 or the low-side current sensor 162.

FIG. 9 shows a timing diagram in accordance with at least some embodiments. The time scale in FIG. 9 is not necessarily to scale. In particular, plot 900 shows a graph of a positive-biased sensing signal upon the charging current sense node 654 and representing the first charging current $I_{CHARGE1}$, which increases over the charging time interval $T_{ON}$ as the inductance 128 is charged. In other words, FIG. 9 illustrates a positive-biased sensing signal, such as may be produced by the low-side current sensor 162 shown in the example embodiment of FIG. 8. The first charging current $I_{CHARGE1}$ shown in FIG. 9 may be sensed by the low-side current sensor 162 when the AC source 106 is in the positive half-line cycle (i.e. in the configuration shown in FIG. 2). The high-side current sensor 160 may produce a similar positive-biased sensing signal upon the charging current sense node 654 representing the second charging current $I_{CHARGE2}$ when the AC source 106 is in the negative half-line cycle (i.e. in the configuration shown in FIG. 4).

Figure 10:
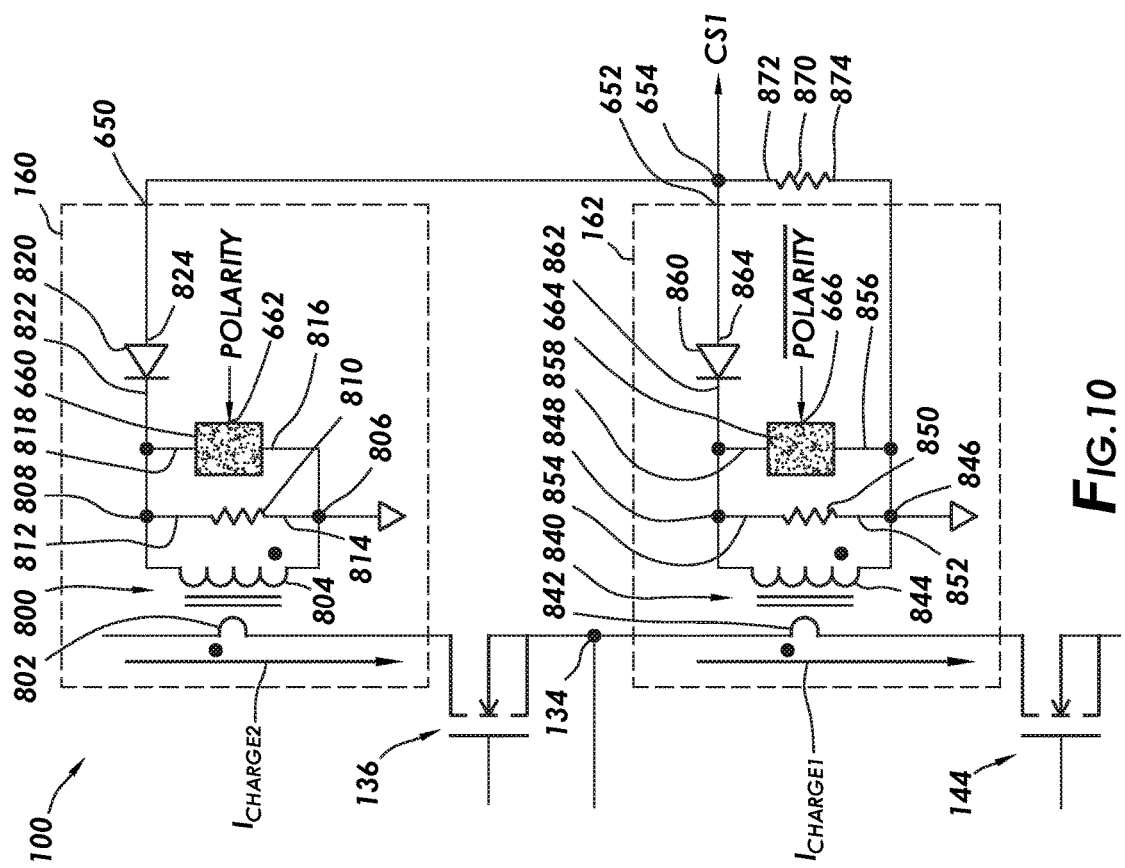
FIG. 10 shows an electrical schematic of a portion of a bridgeless PFC converter in accordance with at least some embodiments.

FIG. 10 shows an electrical schematic of a portion of the bridgeless PFC converter 100 in accordance with at least some embodiments. The bridgeless PFC converter 100 of FIG. 10 includes a high-side current sensor 160 that is identical in form and function to the high-side current sensor 160 described above with reference to FIG. 8, except the secondary winding 804 of the high-side CT 800 is configured in an opposite winding direction (as indicated by the dot adjacent the reference node 806), and the high-side rectifier 820 is configured to be conductive in an opposite direction. In operation, the secondary winding 804 of the high-side CT 800 generates a current from the high-side sense node 808 to the reference node 806 proportional to the second charging current $I_{CHARGE2}$. The high-side sense node 808, therefore, has a negative-biased output voltage relative to the reference node 806. That negative-biased output voltage is transmitted through the high-side rectifier 820 to the charging current sense node 654.

The low-side current sensor 162 in the example embodiment of FIG. 10 is identical in form and function to the low-side current sensor 162 described above with reference to FIG. 8, except the secondary winding 844 of the low-side CT 840 is configured in an opposite winding direction (as indicated by the dot adjacent the reference node 846), and the low-side rectifier 860 is configured to be conductive in an opposite direction. In operation, the secondary winding 844 of the low-side CT 840 generates a current from the low-side sense node 848 to the reference node 846 proportional to the first charging current $I_{CHARGE1}$. The low-side sense node 848 is, therefore, negatively biased relative to the reference node 846. That negative-biased signal is transmitted through the low-side rectifier 860 to the charging current sense node 654.

Figure 11:
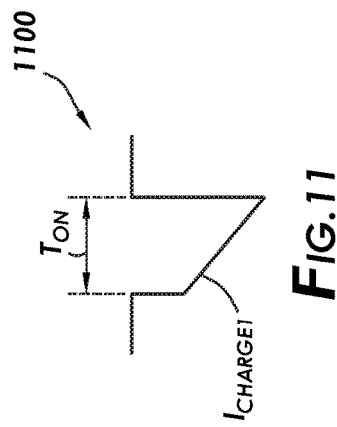
FIG. 11 shows a timing diagram of a charge current sense signal representing a charging current of an inductance within a bridgeless power factor correcting (PFC) converter in accordance with at least some embodiments.

FIG. 11 shows a timing diagram in accordance with at least some embodiments. The time scale in FIG. 11 is not necessarily to scale. In particular, plot 1100 shows a graph of a negative-biased sensing signal upon the charging current sense node 654 and representing the first charging current $I_{CHARGE1}$, which increases over the charging time interval $T_{ON}$ as the inductance 128 is charged. In other words, FIG. 11 illustrates a negative-biased sensing signal, such as may be produced by the low-side current sensor 162 shown in the example embodiment of FIG. 10. The first charging current $I_{CHARGE1}$ shown in FIG. 11 may be sensed by the low-side current sensor 162 when the AC source 106 is in the positive half-line cycle (i.e. in the configuration shown in FIG. 2). The high-side current sensor 160 may produce a similar negative-biased sensing signal upon the charging current sense node 654 representing the second charging current $I_{CHARGE2}$ when the AC source 106 is in the negative half-line cycle (i.e. in the configuration shown in FIG. 4).

Figure 12:
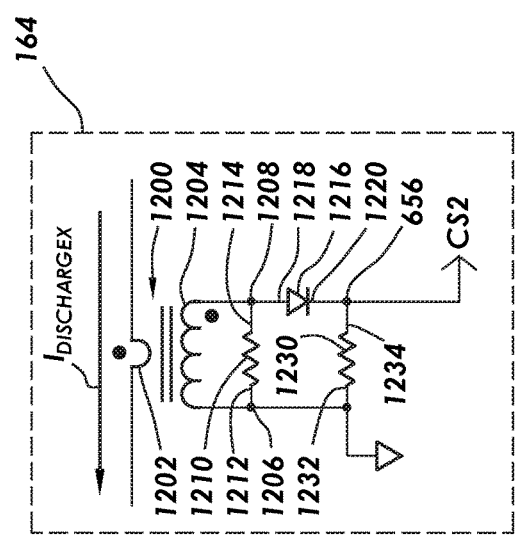
FIG. 12 shows an electrical schematic of a discharge current sensor in accordance with at least some embodiments.

FIG. 12 shows an electrical schematic of the discharge current sensor 164 in accordance with at least some embodiments. Specifically, the discharge current sensor 164 includes a discharge CT 1200 including a primary winding 1202 and a secondary winding 1204. The primary winding 1202 is configured to measure the either discharge current $I_{DISCHARGE1}$ or $I_{DISCHARGE2}$ in the bridgeless PFC converter 100 (and thus the figure shows $I_{DISCHARGEX}$). The secondary winding 1204 generates an output current from a reference node 1206 to a discharge sense node 1208, with the output current proportional to the discharge current $I_{DISCHARGEX}$. The reference node 1206 is connected to a signal ground. The example discharge current sensor 164 also includes a discharge reset resistor 1210 defining a first resistor lead 1212 and a second resistor lead 1214. The first and second resistor leads 1212, 1214 are connected to the discharge reference node 1206 and the discharge sense node 1208, respectively. The discharge current sensor 164 also includes a discharge rectifier 1216 defining a first rectifier lead 1218 and a second rectifier lead 1220. The first rectifier lead 1218 is connected to the discharge sense node 1208 and the second rectifier lead 1220 is connected to the discharge current sense node 656. More specifically, the discharge rectifier 1220 shown in FIG. 12 is configured to conduct current from the discharge sense node 1208 to the discharge current sense node 656 while blocking current flow in an opposite direction. In other embodiments not shown in the figures, the discharge current sensor 164 may be configured to generate a negative polarity upon the discharge current sense node 656 by reversing the polarity of the secondary winding and by reversing the polarity of the discharge rectifier 1216. Such a negative polarity configuration may operate in similar fashion to the current sensors 160, 162 described above with reference to FIG. 10. In at least some embodiments, and as shown in FIG. 12, discharge rectifier 1216 includes a single diode, but other rectifier arrangements may be used (e.g. a switching rectifier).

Still referring to FIG. 12, discharge current sensor 164 also includes a discharge signal resistor 1230 defining a first resistor lead 1232 and a second resistor lead 1234. The first resistor lead 1232 is connected to a signal ground and the second resistor lead 1234 is connected to the discharge current sense node 656. The discharge signal resistor 1230 may, therefore, function to pull-down the discharge current sense node 656 to match the 0V potential of the signal ground when the discharge current sense node 656 is not energized by the discharge sense node 1208 through the discharge rectifier 1216.

Figure 13:
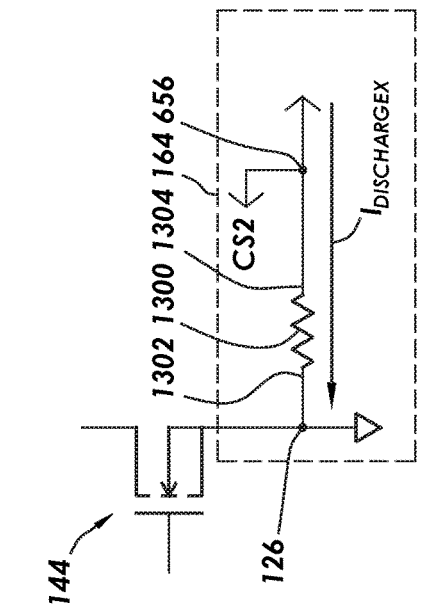
FIG. 13 shows an electrical schematic of a discharge current sensor in accordance with at least some embodiments.

FIG. 13 shows an electrical schematic of the discharge current sensor 164 in accordance with at least some embodiments. The example discharge current sensor 164 shown in FIG. 13 includes a discharge sense resistor 1300 defining a first resistor lead 1302 and a second resistor lead 1304. The first resistor lead 1302 is connected to the negative node 126 and also to a signal ground. The second resistor lead 1304 is connected to the discharge current sense node 656. In operation, the second discharge current $I_{DISCHARGE2}$ is conducted through the discharge sense resistor 1300, which generates a corresponding voltage drop between the first and second resistor leads 1302, 1304. That voltage drop, therefore, comprises the discharge current signal upon the discharge current sense node 656. The discharge current sensor 164 shown in FIG. 13 operates in a similar fashion to the discharge current sensor 164 shown in FIG. 12 in order to sense the discharge current $I_{DISCHARGEX}$.

Figure 14:
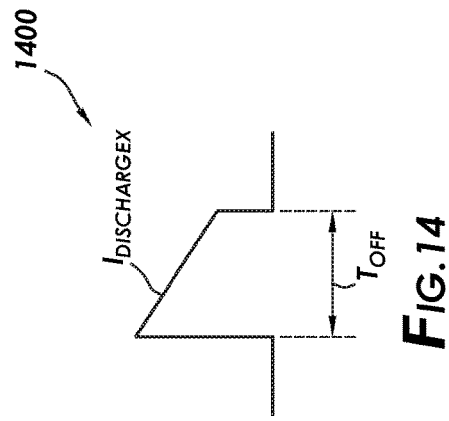
FIG. 14 shows a timing diagram of a discharging current sense signal representing a discharging current of an inductance within a bridgeless power factor correcting (PFC) converter in accordance with at least some embodiments.

FIG. 14 shows a timing diagram in accordance with at least some embodiments. The time scale in FIG. 14 is not necessarily to scale. In particular, plot 1400 shows a graph of a discharge current $I_{DISCHARGEX}$, which decreases over the discharging time interval $T_{OFF}$ as the inductance 128 is discharged regardless of half-line cycle. In other words, FIG. 14 illustrates a positive-biased signal, such as may be produced by the discharge current sensor 164 upon the discharge current sense node 656.

Figure 15:
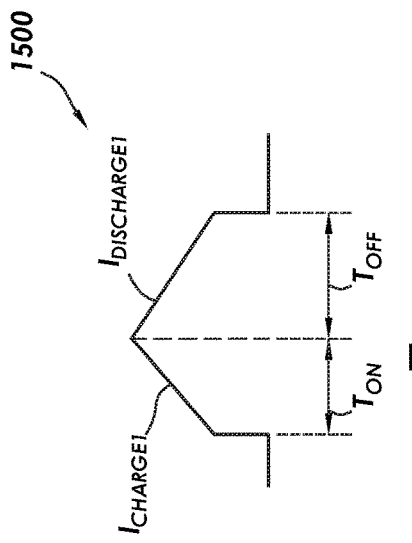
FIG. 15 shows a timing diagram of a composite current within a bridgeless power factor correcting (PFC) converter in accordance with at least some embodiments.

FIG. 15 shows a timing diagram in accordance with at least some embodiments. The time scale in FIG. 15 is not necessarily to scale. In particular, plot 1500 shows a graph of a composite signal including both of the first charging current $I_{CHARGE1}$ and the first discharge current $I_{DISCHARGE1}$. The composite signal represented on FIG. 15 is the output signal of the summing output 716, discussed above with reference to FIG. 7 and when the AC source 106 is in the positive half-line cycle (i.e. in the configuration shown in FIGS. 2-3). The summing output 716 may produce a similar summing signal including both of the second charging current $I_{CHARGE2}$ and the second discharge current $I_{DISCHARGE2}$ when the AC source 106 is in the negative half-line cycle (i.e. in the configuration shown in FIGS. 4-5).

FIG. 16 shows an electrical schematic of an example switch 660, 664 for use within the bridgeless PFC 100 converter in accordance with at least some embodiments. The example switch 660, 664 shown in FIG. 16 defines the first switch lead 816, 856 and the second switch lead 818, 858 and the command input 662, 666. In accordance with some embodiments, the example switch 660, 664 is configured to selectively conduct electrical current from the first switch lead 816, 856 to the second switch lead 818, 858 in response to de-assertion of the command input 662, 666. The example switch 660, 664 is configured to block electrical current from flowing between the first switch lead 816, 856 and the second switch lead 818, 858 with the command input 662, 666 asserted and with the second switch lead 818, 858 having either positive or negative voltage relative to the first switch lead 816, 856. In other words, the example switch 660, 664 functions as a two-quadrant switch. Four-quadrant switches may also be used for the high-side switch 660 and/or the low-side switch 664.

Specifically, the example switch 660, 664 shown in FIG. 16 includes a first FET 1600 defining a gate 1602, a drain 1604 coupled to the second switch lead 818, 858 and a source 1606 coupled to a center node 1608. A first body diode 1610 includes an anode terminal connected to the drain 1604 and a cathode terminal connected to the source 1606 of the first FET 1600. A second FET 1612 defines a gate 1614 coupled to the gate 1602 of the first FET 1600, a drain 1616 coupled to the first switch lead 816, 856, and a source 1618 coupled to the center node 1608. A second body diode 1620 includes an anode terminal connected to the drain 1616 and a cathode terminal connected to the source 1618 of the second FET 1612. An external diode 1622 defines an anode terminal 1624 and a cathode terminal 1626. The anode terminal 1624 is connected to the gate 1602 of the first FET 1600 and the gate 1614 of the second FET 1612, and the cathode terminal 1626 is connected to the first switch lead 816, 856. The example switch 660, 664 also includes a resistor 1628 defining a first lead 1630 connected to the center node 1608 and a second lead 1632 connected to both of the gates 1602, 1614 of the first and second FETs 1600, 1612. A signal capacitor 1634 defines a first lead 1636 connected to the command input 662, 666 and a second lead 1638 connected to both of the gates 1602, 1614 of the first and second FETs 1600, 1612.

FIG. 17 shows an electrical schematic of a switch within a bridgeless power factor correcting (PFC) converter in accordance with at least some embodiments. The example switch 660, 664 shown in FIG. 17 defines the first switch lead 816, 856 and the second switch lead 818, 858 and the command input 662, 666. In accordance with some embodiments, the example switch 660, 664 is configured to selectively conduct electrical current from the first switch lead 816, 856 to the second switch lead 818, 858 in response to the command input 662, 666 being de-asserted. The example switch 660, 664 is configured to block electrical current from flowing between the first switch lead 816, 856 and the second switch lead 818, 858 with the command input 662, 666 de-asserted and with the second switch lead 818, 858 having either positive or negative voltage relative to the first switch lead 816, 856. In other words, the example switch 660, 664 functions as a two-quadrant switch. Four-quadrant switches may also be used for the high-side switch 660 and/or the low-side switch 664. Specifically, the example switch 660, 664 shown in FIG. 17 includes a p-channel FET 1700 defining a gate 1702, a drain 1704 coupled to the second switch lead 818, 858 and a source 1706 coupled to a center node 1708. A body diode 1710 includes an anode terminal connected to the drain 1704 and a cathode terminal connected to the source 1706 of the p-channel FET 1700. The example switch 660, 664 also includes a diode 1712 defining an anode terminal 1714 connected to the first switch lead 816, 856 and a cathode terminal 1716 connected to the center node 1708.

The switches 660, 664 are each used to block a relatively large negative reset voltage and a relatively small positive sense voltage at the second switch lead 818, 858 relative to the first switch lead 816, 856 in the OFF (i.e. non-conductive) condition. The switches 660, 664 are also each used to conduct current from the first switch lead 816, 856 to the second switch lead 818, 858 in the ON (i.e. conductive) condition. The example switch 660, 664 shown in FIG. 16 is more complex than the example switch example switch 660, 664 shown in FIG. 17, but the example switch 660, 664 shown in FIG. 16 may have a higher capacity to block either or both of the positive and/or negative voltages at the second switch lead 818, 858 in the OFF condition. Additionally or alternatively, the example switch 660, 664 shown in FIG. 16 may be capable of conducting more current from the first switch lead 816, 856 to the second switch lead 818, 858 in the ON condition when compared with the example switch 660, 664 shown in FIG. 17.

Figure 18:
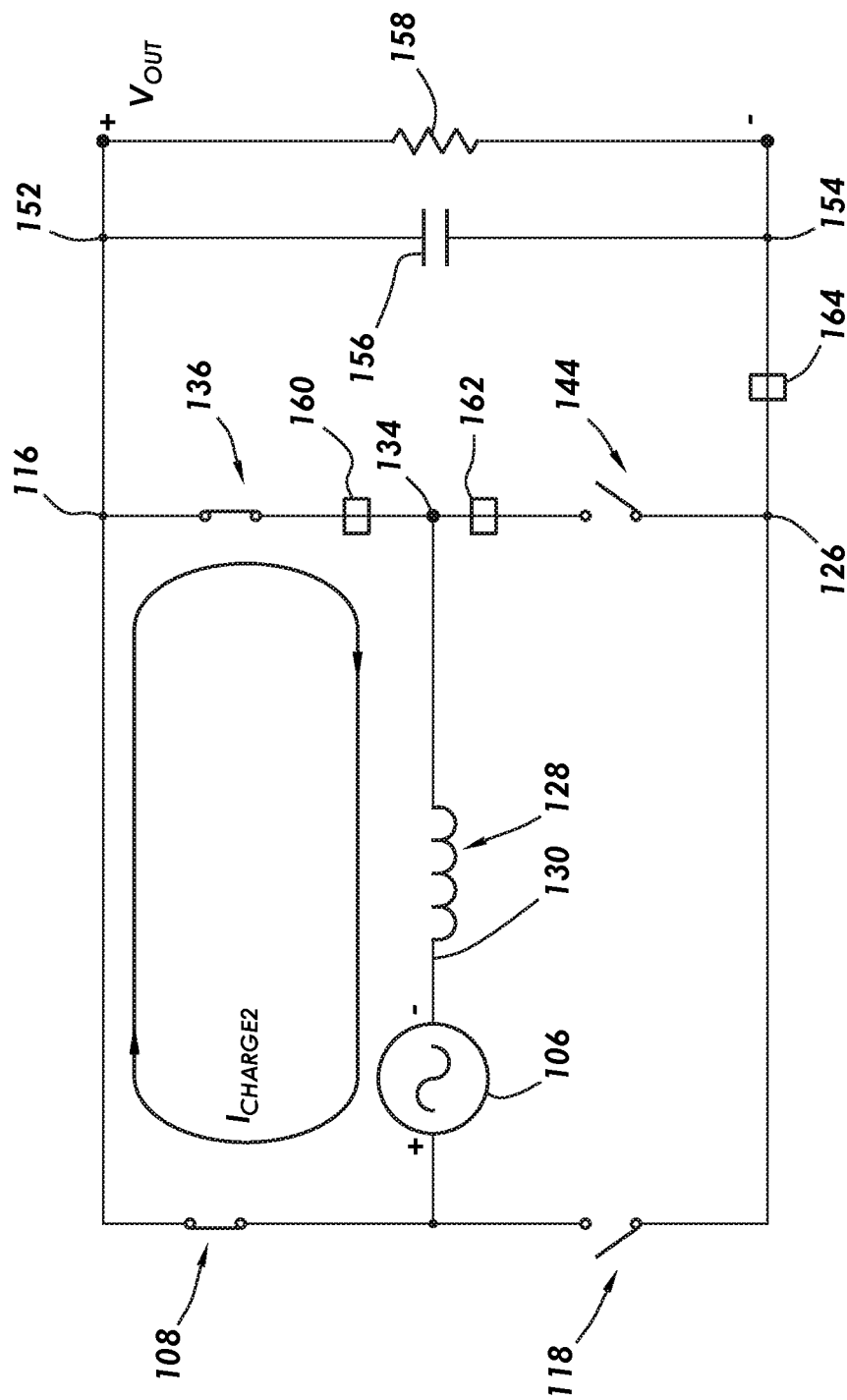
FIG. 18 shows an electrical schematic of a bridgeless power factor correcting (PFC) converter in accordance with at least some embodiments.
Figure 19:
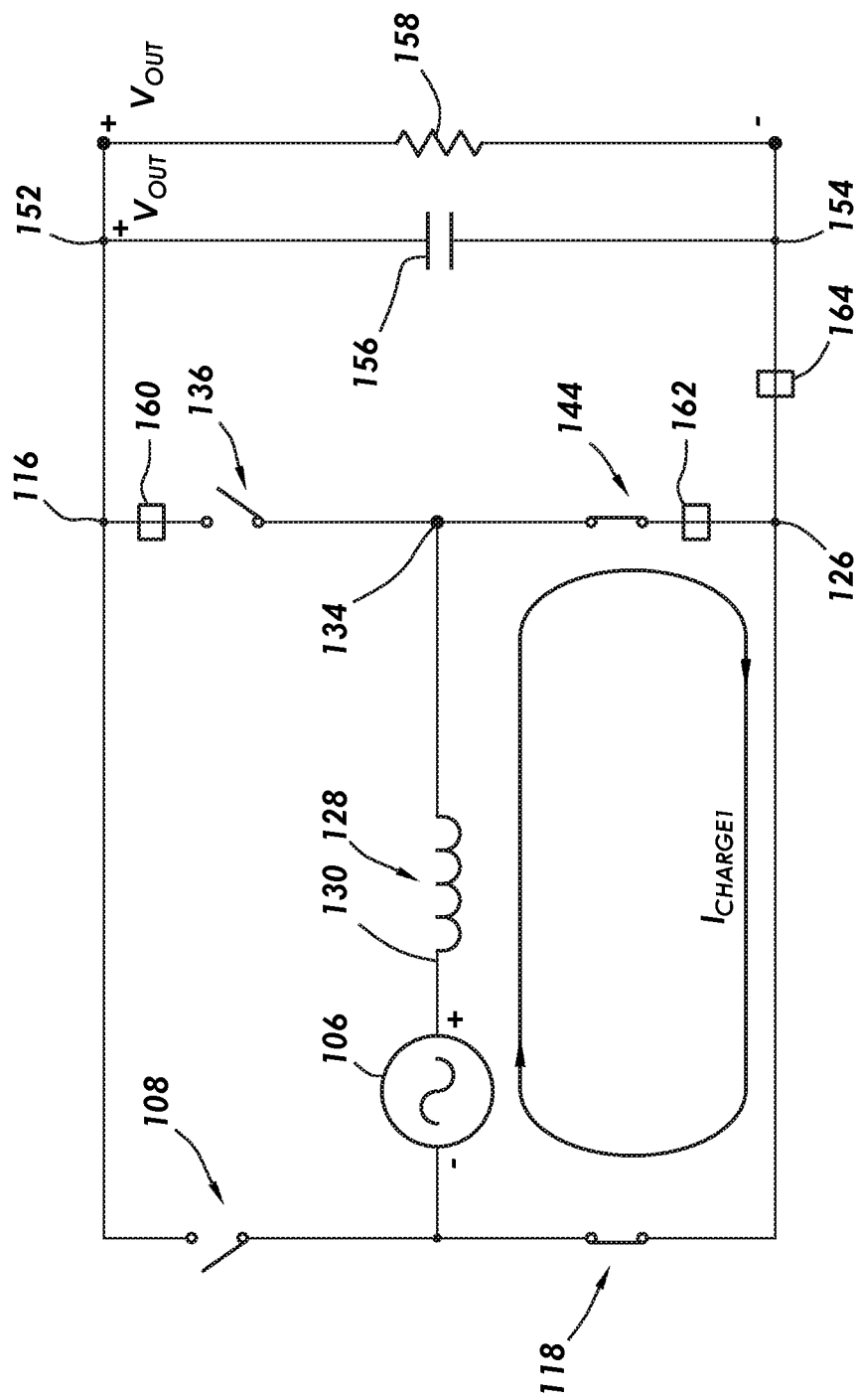
FIG. 19 shows an electrical schematic of a bridgeless power factor correcting (PFC) converter in accordance with at least some embodiments.

FIG. 18 shows an electrical schematic of a bridgeless PFC converter 100 in accordance with at least some embodiments. Specifically, FIG. 19 shows a variation of the bridgeless PFC converter 100 described above with reference to FIG. 1, but with the high-side current sensor 160 in a different location. As shown in FIG. 18, the high-side current sensor 160 is configured to sense the current between the fast leg high-side FET 136 and the switch node 134. In other embodiments, such as those discussed above with reference to FIG. 1, the high-side current sensor 160 is configured to sense the current between the positive node 116 and the fast leg high-side FET 136. Either of these configurations provides for the high-side current sensor 160 to measure the second charging current $I_{CHARGE2}$ through the fast leg high-side FET 136.

FIG. 19 shows an electrical schematic of a bridgeless PFC converter 100 in accordance with at least some embodiments. Specifically, FIG. 19 shows a variation of the bridgeless PFC converter 100 described above with reference to FIG. 1, but with the low-side current sensor 162 in a different location. As shown in FIG. 19, the low-side current sensor 162 is configured to sense the current between the fast leg low-side FET 144 and the negative node 126. In other embodiments, such as those discussed above with reference to FIG. 1, the low-side current sensor 162 is configured to sense the current between the switch node 134 and the fast leg low-side FET 144. Either of these configurations provides for the low-side current sensor 162 to measure the first charging current $I_{CHARGE1}$ through the fast leg low-side FET 144.

Figure 20:
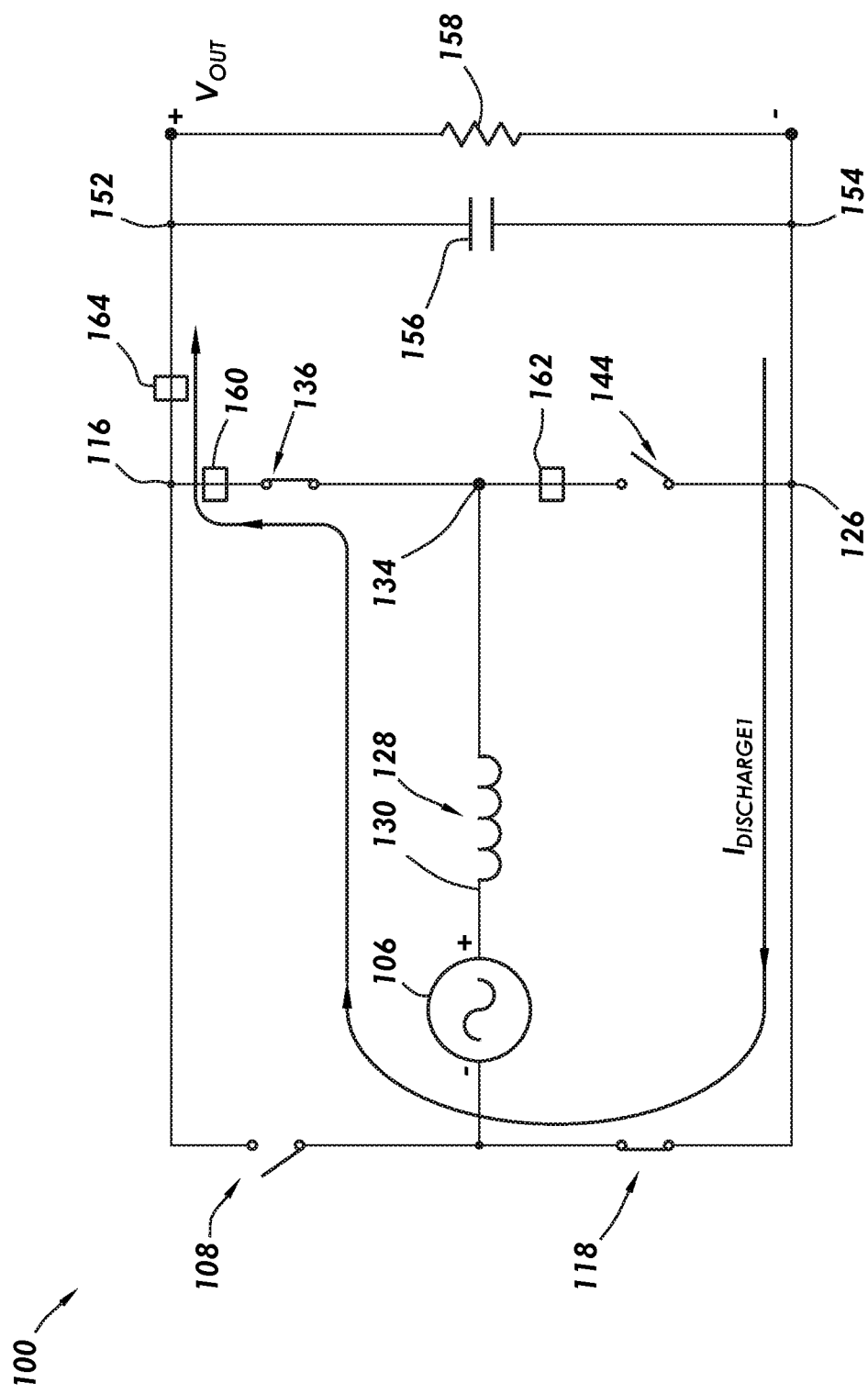
FIG. 20 shows an electrical schematic of a bridgeless power factor correcting (PFC) converter in accordance with at least some embodiments.

FIG. 20 shows an electrical schematic of a bridgeless power factor correcting (PFC) converter 100 in accordance with at least some embodiments. Specifically, FIG. 20 shows a variation of the bridgeless power factor correcting (PFC) converter 100 described, above, with reference to FIG. 1, but with the discharge current sensor 164 in a different location. As shown in FIG. 20, the discharge current sensor 164 is configured to sense current through a conductor between the positive node 116 and the output capacitor 156 (i.e. to sense the current between the positive node 116 and the positive output 152). In other embodiments, such as those discussed above with reference to FIG. 1, the discharge current sensor 164 is configured to sense the current through a conductor between the negative node 126 and the negative output 154 (i.e. to sense the current between the negative node 126 and the negative output 154). Either of these configurations allows the discharge current sensor 164 to measure the discharge currents $I_{DISCHARGE1}$, $I_{DISCHARGE2}$ through the inductance 128 as the inductance 128 is discharged.

Figure 21:
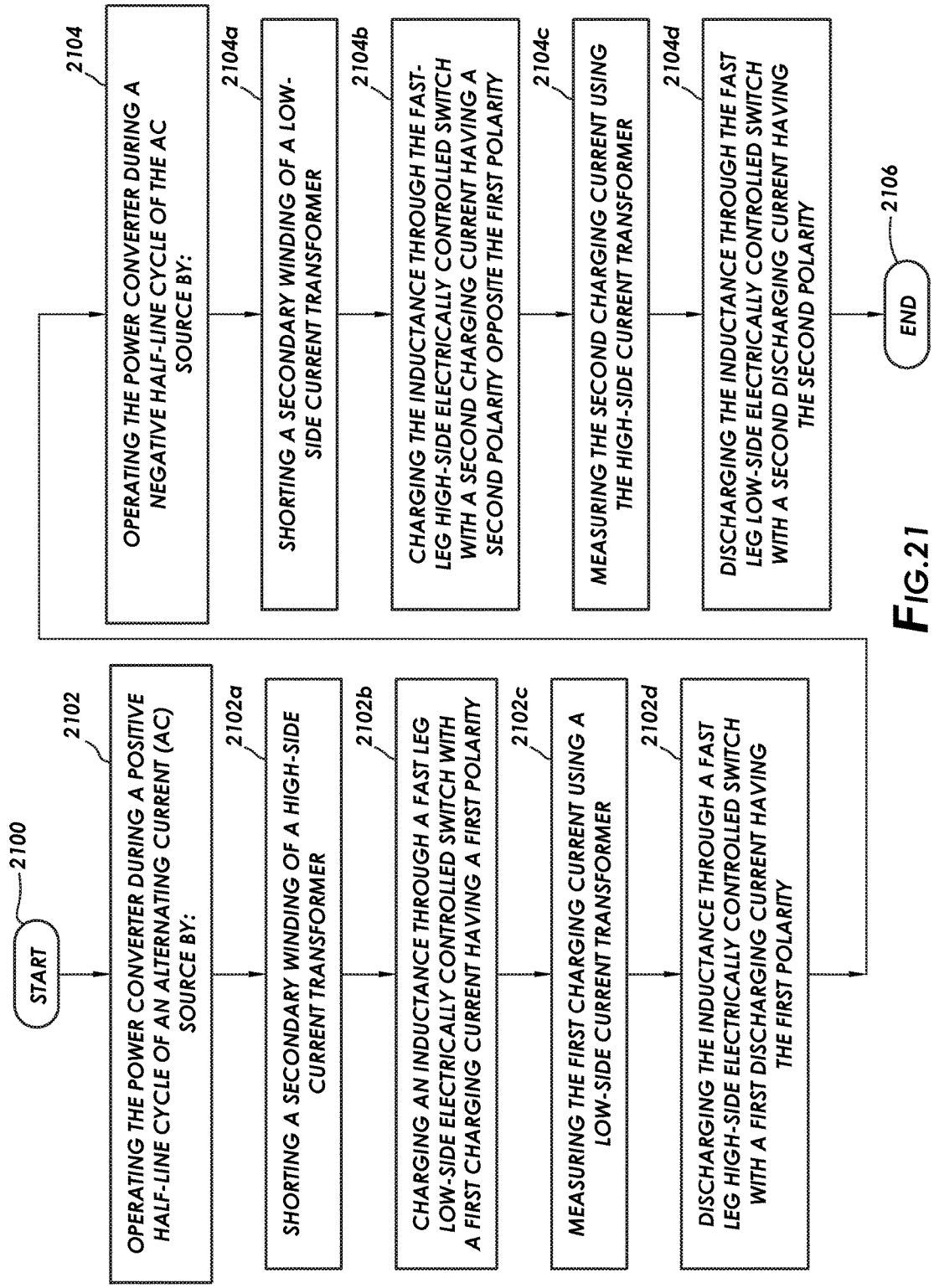
FIG. 21 shows method steps in accordance with at least some embodiments.

FIG. 21 shows a method of operating a power converter in accordance with at least some embodiments. In particular, the method starts (block 2100) and comprises: operating the power converter during a positive half-line cycle of an alternating current (AC) source (block 2102); and operating the power converter during a negative half-line cycle of the AC source (block 2104); Thereafter the method ends (block 2106). Specifically, block 2102 includes shorting a secondary winding of a high-side current transformer (block 2102*a*); charging an inductance through a fast leg low-side electrically controlled switch with a first charging current having a first polarity (block 2102*b*); measuring the first charging current using a low-side current transformer (block 2102*c*); and then discharging the inductance through a fast leg high-side electrically controlled switch with a first discharging current having the first polarity (block 2102*d*). Similarly, block 2104 includes shorting a secondary winding of the low-side current transformer (block 2104*a*); charging the inductance through the fast leg high-side electrically controlled switch with a second charging current having a second polarity opposite the first polarity (block 2104*b*); measuring the second charging current using the high-side current transformer (block 2104*c*); and then discharging the inductance through the fast leg low-side electrically controlled switch with a second discharging current having the second polarity (block 2104*d*). In some embodiments, the inductance is charged and discharged in a continuous conduction mode.

In some embodiments, shorting the secondary winding of the high-side current transformer (block 2102*a*) is performed throughout the positive half-line cycle of the AC source (block 2102). In other embodiments, shorting the secondary winding of the high-side current transformer (block 2102*a*) is performed for less than the entire time of the positive half-line cycle of the AC source (block 2102).

In some embodiments, shorting the secondary winding of the low-side current transformer (block 2104*a*) is performed throughout the negative half-line cycle of the AC source (block 2104). In other embodiments, shorting the secondary winding of the low-side current transformer (block 2104*a*) is performed for less than the entire time of the negative half-line cycle of the AC source (block 2104).

In some embodiments, the step of measuring the first charging current using the low-side current transformer (block 2102*c*) further includes: generating an output voltage upon a low-side sense node by the secondary winding of the low-side current transformer; and conducting current between the low-side sense node and a current sense node through a low-side rectifier, with the low-side rectifier configured to conduct current from the low-side sense node to the current sense node and to block electrical current in an opposite direction. This operation is further described in the present disclosure with reference to FIG. 8.

In some embodiments, the step of measuring the second charging current using the high-side current transformer (block 2104*c*) further includes: generating an output voltage upon a high-side sense node by the secondary winding of the high-side current transformer; and conducting current between the high-side sense node and the current sense node through a high-side rectifier, with the high-side rectifier configured to conduct current from the high-side sense node to the current sense node and to block electrical current in an opposite direction. This operation is further described in the present disclosure with reference to FIG. 8.

In some embodiments, the step of measuring the first charging current using the low-side current transformer (block 2102*c*) further includes: generating an output voltage upon a low-side sense node by the secondary winding of the low-side current transformer; and conducting current between the low-side sense node and a current sense node through a low-side rectifier, with the low-side rectifier configured to conduct current from the current sense node to the low-side sense node and to block electrical current in an opposite direction. This operation is further described in the present disclosure with reference to FIG. 10.

In some embodiments, the step of measuring the second charging current using the high-side current transformer (block 2104*c*) further includes: generating an output voltage upon a high-side sense node by the secondary winding of the high-side current transformer; and conducting current between the high-side sense node and the current sense node through a high-side rectifier, with the high-side rectifier configured to conduct current from the current sense node to the high-side sense node and to block electrical current in an opposite direction. This operation is further described in the present disclosure with reference to FIG. 10.

In some embodiments, the method of operating a power converter further comprises: measuring the first discharging current by a discharge current sensor; measuring the second discharging current by the discharge current sensor; calculating a first composite current as a sum of the first charging current and the first discharging current; and calculating a second composite current as a sum of the second charging current and the second discharging current. This operation is further described in the present disclosure with reference to FIG. 15.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, comprising:
   operating the power converter during a positive half-line cycle of an alternating current (AC) source by:
      shorting a secondary winding of a high-side current transformer;
      charging an inductance through a fast leg low-side electrically controlled switch with a first charging current having a first polarity;
      measuring the first charging current using a low-side current transformer; and then
      discharging the inductance through a fast leg high-side electrically controlled switch with a first discharging current having the first polarity;
   operating the power converter during a negative half-line cycle of the AC source by:
      shorting a secondary winding of the low-side current transformer;
      charging the inductance through the fast leg high-side electrically controlled switch with a second charging current having a second polarity opposite the first polarity;
      measuring the second charging current using the high-side current transformer; and then
      discharging the inductance through the fast leg low-side electrically controlled switch with a second discharging current having the second polarity.

2. The method of claim 1, wherein the inductance is charged and discharged in a continuous conduction mode.

3. The method of claim 1:
   wherein measuring the first charging current using the low-side current transformer further comprises:
      generating an output voltage upon a low-side sense node by the secondary winding of the low-side current transformer;
      conducting current between the low-side sense node and a current sense node through a low-side rectifier, with the low-side rectifier configured to conduct current from the low-side sense node to the current sense node and to block electrical current in an opposite direction; and
   wherein measuring the second charging current using the high-side current transformer further comprises:
      generating an output voltage upon a high-side sense node by the secondary winding of the high-side current transformer;
      conducting current between the high-side sense node and the current sense node through a high-side rectifier, with the high-side rectifier configured to conduct current from the high-side sense node to the current sense node and to block electrical current in an opposite direction.

4. The method of claim 1:
wherein measuring the first charging current using a low-side current transformer further comprises:
generating an output voltage upon a low-side sense node by the secondary winding of the low-side current transformer;
conducting current between the low-side sense node and a current sense node through a low-side rectifier, with the low-side rectifier configured to conduct current from the current sense node to the low-side sense node and to block electrical current in an opposite direction; and
wherein measuring the second charging current using the high-side current transformer further comprises:
generating an output voltage upon a high-side sense node by the secondary winding of the high-side current transformer;
conducting current between the high-side sense node and the current sense node through a high-side rectifier, with the high-side rectifier configured to conduct current from the current sense node to the high-side sense node and to block electrical current in an opposite direction.

5. The method of claim 1, further comprising:
measuring the first discharging current by a discharge current sensor;
measuring the second discharging current by the discharge current sensor;
calculating a first composite current as a sum of the first charging current and the first discharging current; and
calculating a second composite current as a sum of the second charging current and the second discharging current.

6. A bridgeless power factor correcting (PFC) converter, comprising:
a first line input and a second line input;
a slow leg high-side field effect transistor (FET) defining a gate, a source coupled to the first line input, and a drain coupled to a positive node;
a slow leg low-side FET defining a gate, a drain coupled to the first line input, and a source coupled to a negative node;
an inductance defining a first lead coupled to the second line input, and a second lead defining a switch node;
a fast leg high-side FET defining a gate, a source coupled to the switch node, and a drain coupled to the positive node;
a high-side current transformer (CT) configured to sense current through the fast leg high-side FET;
a fast leg low-side FET defining a gate, a source coupled to the negative node, and a drain coupled to the switch node;
a low-side CT configured to sense current through the fast leg low-side FET;
a PFC controller configured to operate the converter during a positive half-line cycle of an alternating current (AC) source coupled to the first and second line inputs, the operation by causing the converter to:
charge inductance through the fast leg low-side FET with a first charging current having a first polarity;
measure the first charging current using the low-side CT, while shorting a secondary winding of the high-side CT; and then discharge the inductance through the fast leg high-side FET with a first discharging current having the first polarity;
the PFC controller configured to operate the converter during a negative half-line cycle of the AC source by causing the converter to:
charge the inductance through the fast leg high-side FET with a second charging current having a second polarity opposite the first polarity;
measure the second charging current using the high-side CT, while shorting a secondary winding of the low-side CT; and then
discharge the inductance through the fast leg low-side FET with a second discharging current having the second polarity.

7. The bridgeless PFC converter of claim 6, wherein the PFC controller is configured to charge and to discharge the inductance in a continuous conduction mode.

8. The bridgeless PFC converter of claim 6, further comprising:
the PFC controller configured to assert a polarity output during the positive half-line cycle of the AC source and to de-assert the polarity output during the negative half-line cycle of the AC source;
a high-side switch configured to conduct current between the first and the second secondary terminals of the high-side CT in response to the polarity output being asserted; and
a low-side switch configured to conduct current between the first and the second secondary terminals of the low-side CT in response to the polarity output being de-asserted.

9. The bridgeless PFC converter of claim 6, wherein the high-side CT is configured to measure the second charging current between the positive node and the fast leg high-side FET, or between the fast leg high-side FET and the switch node.

10. The bridgeless PFC converter of claim 6, wherein the low-side CT is configured to measure the first charging current between the switch node and the fast leg low-side FET, or between the fast leg low-side FET and the negative node.

11. The bridgeless PFC converter of claim 6, further comprising: a discharge current sensor configured to measure the first discharging current and the second discharging current.

12. The bridgeless PFC converter of claim 11, wherein the discharge current sensor further includes a current transformer (CT) configured to sense a current between the positive node and the negative node.

13. The bridgeless PFC converter of claim 11, wherein the discharge current sensor is configured to measure each of the first discharging current and the second discharging current between the negative node and an output capacitor.

14. The bridgeless PFC converter of claim 11, wherein the discharge current sensor is configured to measure each of the first discharging current and the second discharging current between the positive node and an output capacitor.

15. The bridgeless PFC converter of claim 6, further comprising:
the secondary winding of the low-side current transformer configured to generate an output voltage upon a low-side sense node;
a low-side rectifier coupled between the low-side sense node and a current sense node, with the low-side rectifier configured to conduct current from the low-side sense node to the current sense node and to block electrical current in an opposite direction;

the secondary winding of the high-side current transformer configured to generate an output voltage upon a high-side sense node;

a high-side rectifier coupled between the high-side sense node and the current sense node, with the high-side rectifier configured to conduct current from the high-side sense node to the current sense node and to block electrical current in an opposite direction.

16. The bridgeless PFC converter of claim 6, further comprising:

the secondary winding of the low-side current transformer configured to generate an output voltage upon a low-side sense node;

a low-side rectifier coupled between the low-side sense node and a current sense node, with the low-side rectifier configured to conduct current from the current sense node to the low-side sense node and to block electrical current in an opposite direction;

the secondary winding of the high-side current transformer configured to generate an output voltage upon a high-side sense node;

a high-side rectifier coupled between the high-side sense node and the current sense node, with the high-side rectifier configured to conduct current from the current sense node to the high-side sense node and to block electrical current in an opposite direction.

17. The bridgeless PFC converter of claim 6, further comprising:

a low-side switch configured to selectively short the secondary winding of the low-side current transformer;

a high-side switch configured to selectively short the secondary winding of the high-side current transformer;

wherein each of the low-side switch and the high-side switch is configured to selectively conduct current between a first lead and a second lead; and wherein one of the low-side switch or the high-side switch includes:

a first FET defining a gate, a drain coupled to the second lead of the one of the high-side switch or the low-side switch and a source coupled to a center node;

a second FET defining a gate coupled to the gate of the first FET, a drain coupled to the first lead of the one of the high-side switch or the low-side switch, and a source coupled to the center node; and a diode defining an anode terminal coupled to the gate of each of the first FET and the gate of the second FET, and a cathode terminal coupled to the to the first lead of the one of the high-side switch or the low-side switch.

18. The bridgeless PFC converter of claim 6, further comprising:

a low-side switch configured to selectively short the secondary winding of the low-side current transformer;

a high-side switch configured to selectively short the secondary winding of the high-side current transformer; and wherein each of the low-side switch and the high-side switch is configured to selectively conduct current between a first lead and a second lead; and wherein one of the low-side switch or the high-side switch includes:

a p-channel FET having defining a gate, a drain coupled to the second lead of the one of the high-side switch or the low-side switch and a source;

a diode defining an anode terminal coupled to the to the first lead of the one of the high-side switch or the low-side switch, and a cathode terminal coupled to the source of the p-channel FET.

19. A packaged integrated circuit (IC) device for controlling a bridgeless power factor correcting (PFC) converter, comprising:

an AC sense terminal, a slow leg high-side terminal, a slow leg low-side terminal, a fast leg high-side terminal, a fast leg low-side terminal, a charge current terminal, and a discharging current terminal;

a line-side controller coupled to the slow leg high-side terminal and the slow leg low-side terminal, the line-side controller configured to sense polarity of an alternating current (AC) connected to the AC sense terminal, and the line-side controller configured to assert the slow leg low-side terminal and de-assert the slow leg high-side terminal when the polarity is positive, and the line-side controller configured to assert the slow leg high-side terminal and de-assert the slow leg low-side terminal when the polarity is negative;

an inductor current monitoring block coupled to the charge current terminal and the discharging current terminal and configured to determine an average inductor current using a charge current signal on the charge current terminal and a discharging current signal on the discharging current terminal;

a polarity output terminal configured to be asserted in response to the alternating current (AC) source being in one of a positive half-line cycle or a negative half-line cycle, the polarity output terminal configured to be de-asserted in response to the alternating current (AC) source being in an opposite one of the positive half-line cycle or the negative half-line cycle as the one of the positive half-line cycle or the negative half-line cycle with the polarity output terminal being asserted.

20. The packaged integrated circuit (IC) device of claim 19, wherein the polarity output terminal is configured to be asserted during the positive half-line cycle of the alternating current (AC) source and to be de-asserted during the negative half-line cycle of the alternating current (AC) source.

* * * * *

UNITED STATES PATENT AND TRADEMARK OFFICE
CERTIFICATE OF CORRECTION

PATENT NO.        : 10,461,632 B1
APPLICATION NO.   : 16/373793
DATED             : October 29, 2019
INVENTOR(S)       : Nikhilesh S. Kamath, Armando Gabriel Mesa and Ajay Karthik Hari It is certified that error appears in the above-identified patent and that said Letters Patent is hereby corrected as shown below:

In the Specification

Column 6,
Line 18, add the words --FIGS. 4 and 5 show the charging current ICHARGE2, and the discharge current IDISCHARGE2-- after the words "More precisely,"
Line 42, add a --,-- after the words "polarity output terminal 606"

Column 7,
Line 29, "830" should be --630--
Line 56, "high-side" should be --low-side--
Line 56, "160" should be --162--

Column 8,
Line 13, "102" should be --106--
Line 28, "102" should be --106--
Line 64, "102" should be --106--

Column 13,
Line 38, delete the word "discharge" after the word "the"
Line 46, "1220" should be --1216--

Column 15,
Line 58, delete the words "example switch" after the word "the"

Column 16,
Line 3, "19" should be --18--
Line 56, "(block 2104); Thereafter the" should be --(block 2104). Thereafter, the--

Signed and Sealed this
Eighteenth Day of February, 2020

Andrei Iancu
*Director of the United States Patent and Trademark Office*

CERTIFICATE OF CORRECTION (continued)
U.S. Pat. No. 10,461,632 B1

In the Claims

Column 19,
Claim 6, Line 63, add the word --the-- after the word "charge"

Column 20,
Claim 8, Line 27, "the first and the second secondary terminals of the" should be --a first and a second secondary terminal of the--
Claim 8, Line 31, "the first and the second secondary terminals of the" should be --a first and a second secondary terminal of the--

Column 21,
Claim 17, Lines 49-50, "a diode defining an anode terminal coupled to the gate of each of the first FET and the gate of the second" should be --a diode defining an anode terminal coupled to each of the gate of the first FET and the gate of the second--
Claim 17, Line 51, delete "to the" after the word "coupled"